United States Patent [19]

Van Eecke et al.

[11] Patent Number: 4,961,679
[45] Date of Patent: * Oct. 9, 1990

[54] AGRICULTURAL BALE ACCUMULATOR WITH BALE TURNING MECHANISM

[75] Inventors: Roger H. Van Eecke, Blankenberge; Adrianus Naaktgeboren, Zedelgem; Bart Van Den Bossche, Jabbeke, all of Belgium

[73] Assignee: Ford New Holland, Inc., New Holland, Pa.

[ * ] Notice: The portion of the term of this patent subsequent to Sep. 11, 2007 has been disclaimed.

[21] Appl. No.: 378,663

[22] Filed: Jul. 11, 1989

[30] Foreign Application Priority Data

Jul. 12, 1988 [EP] European Pat. Off. ...... 88.201.479.8

[51] Int. Cl.⁵ .............................................. B65G 57/00
[52] U.S. Cl. .................................... 414/111; 414/501; 414/781
[58] Field of Search ...................... 414/111, 24.5, 24.6, 414/501, 780, 781

[56] References Cited

U.S. PATENT DOCUMENTS

| | | |
|---|---|---|
| 3,361,279 | 1/1968 | Brown et al. .................. 414/111 X |
| 3,788,495 | 1/1974 | Fachini et al. .................. 414/501 X |
| 3,853,229 | 12/1974 | Dougherty et al. . |
| 4,310,275 | 1/1982 | Hoelscher . |

FOREIGN PATENT DOCUMENTS

| | | |
|---|---|---|
| 192858 | 3/1989 | European Pat. Off. . |
| 7311993 | 8/1973 | Netherlands . |
| 979626 | 1/1965 | United Kingdom . |
| 1378176 | 12/1974 | United Kingdom . |

Primary Examiner—Robert J. Spar
Assistant Examiner—James T. Eller Jr.
Attorney, Agent, or Firm—Darrell F. Marquette; Frank A. Seemar; Larry W. Miller

[57] ABSTRACT

An agricultural bale accumlator includes a load bed adapted for accumulating thereon a plurality of bales with bales being received one after another in a first direction on the load bed. Bale-transfer arms are operable to displace the bales, after receipt on the load bed, across the load bed in a second direction transverse to the first direction and to position these bales in side-by-side relationship on the load bed thus forming a compact parcel thereof. A bale-discharge conveyor is operable to discharge a parcel of bales accumulated on the load bed to the ground. This bale accumulator also comprises a bale-turning mechanism for turning each bale through 90° around its longitudinal axis upon receipt on the load bed.

25 Claims, 15 Drawing Sheets

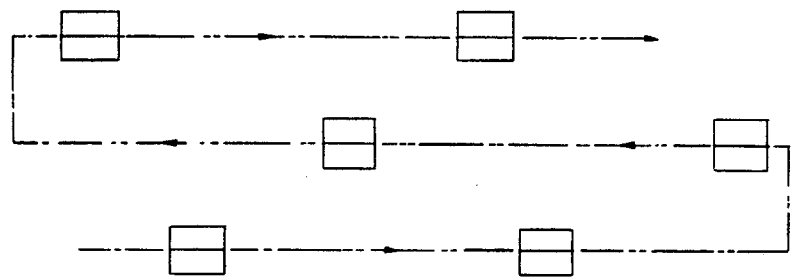
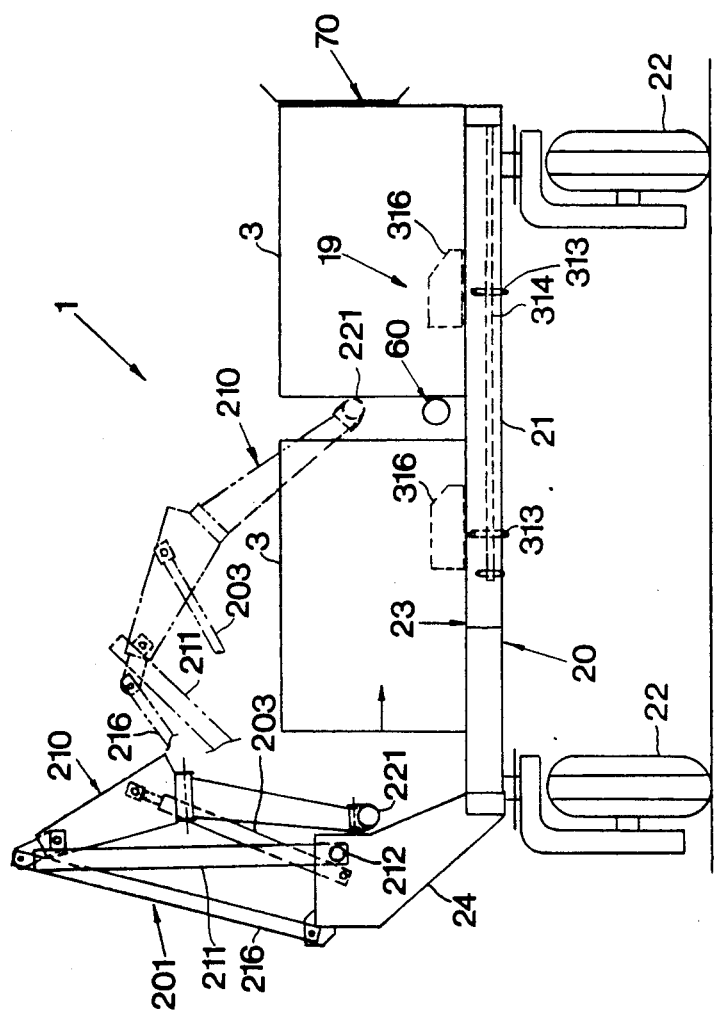
FIG.3

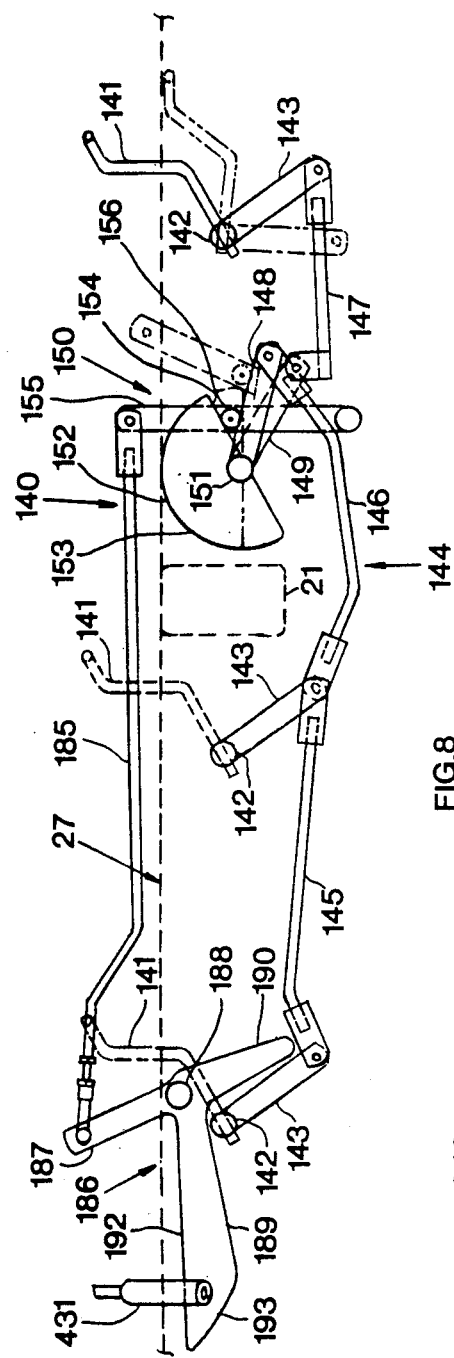
FIG.8
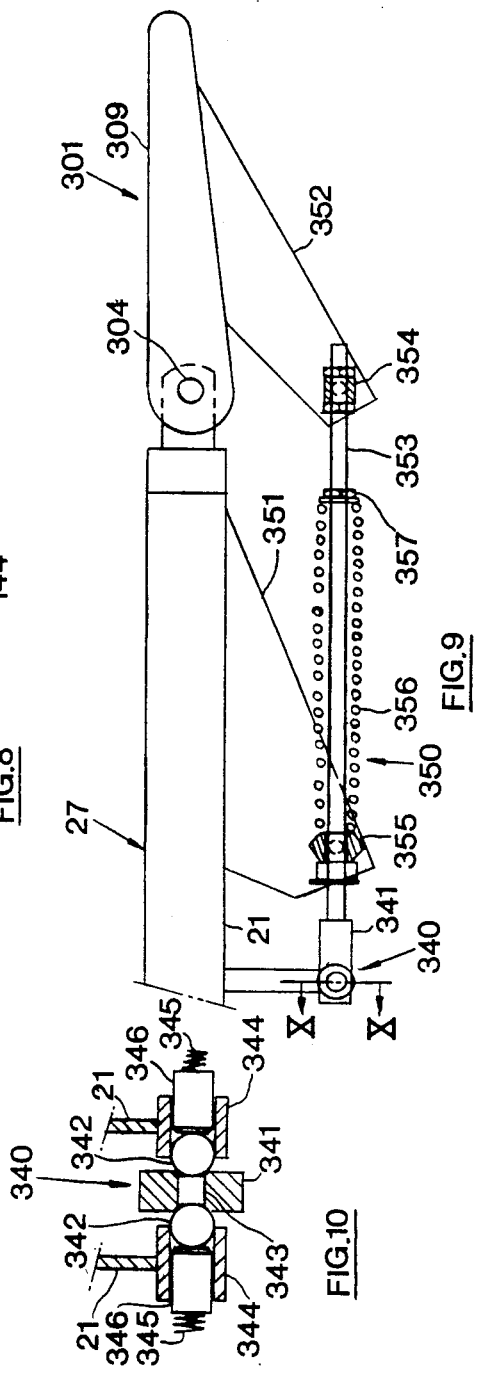
FIG.9
FIG.10

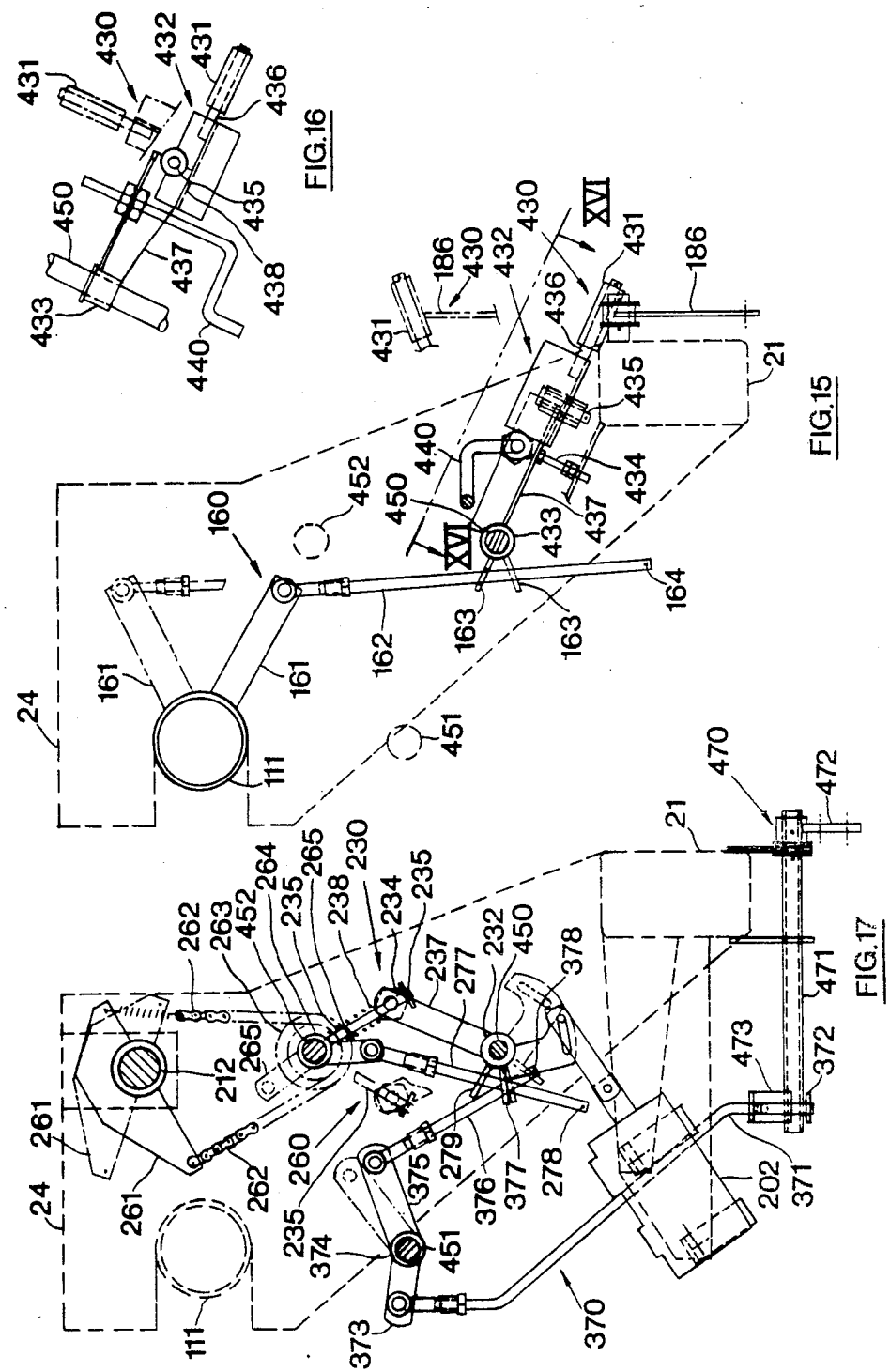

AGRICULTURAL BALE ACCUMULATOR WITH BALE TURNING MECHANISM

This application is related to copending application Ser. No. 07/378,748, filed July 11, 1989.

BACKGROUND OF THE INVENTION

This invention relates to agricultural bale accumulators which are devices trailed behind mobile agricultural crop balers during the baling operation thereof and which are operable to accumulate a plurality of bales in side-by-side relationship and then dump or discharge the given parcel of bales on the ground for subsequent pick-up for transportation to another location.

The invention has been conceived with the so-called medium sized bale in mind which measures in the order of 0.6 m × 0.9 m × 1.2 to 2.4 m and weighs 300 to 600 kg. However, it will be apparent from the description and claims which follow that the invention is not limited to bale accumulators for balers producing medium sized bales and can, in fact, be utilized with great effectiveness in conjunction with so-called large square balers producing bales of up to 1000 kg, as well as with small, conventional square balers.

Agricultural balers are in common use and operate to pick-up and compress crop material, such as hay, straw, etc., into bales and wrap completed bales with wire or twine. Wrapped bales are ejected periodically from the bale chamber of a baler as the latter travels over the field and each bale, on being ejected, normally is discharged directly to the ground.

In order to make the overall baling and bale hauling operation more efficient, it has already been proposed to provide a bale accumulator which is arranged to receive successive bales as they are discharged from a baler and to accumulate the bales into a group or parcel and then discharge the parcel to the ground. A few examples of known bale accumulators are disclosed in U.S. Pat. Nos. 3,272,352; 4,310,275; 4,215,964 and French Patent No. 1,471,621.

U.S. Pat. No. 3,272,352 discloses a bale accumulator which automatically accumulates bales in predetermined parcels and then automatically discharges the parcels. In this arrangement, each parcel is made up of bales standing on their ends in side-by-side relationship. Discharge of a parcel of bales is accomplished by using the weight of the parcel to tilt the floor of the accumulator. In this manner, the bales slide off in successive rows as the machine advances and are deposited, single fashion, on the ground. However, the manner in which the bales are deposited on the ground makes subsequent collection of the parcel of bales by mechanical means difficult, if not impossible.

The aforementioned accumulator is used in conjunction with a conventional baler producing small rectangular bales and having a bale chamber disposed generally to one side of the machine. The load bed upon which the bales are accumulated is disposed in offset relationship to one side of the bale chamber and yet this accumulator has a width extending beyond both opposed sides of the baler as seen in a fore-and-aft direction.

A similar bale accumulator for a baler having a bale chamber generally to one side of the machine is disclosed in U.S. Pat. No. 4,310,275. In operation of this arrangement, bales are received in pairs on a bale-receiving table which is generally aligned with the bale chamber and which is pivotally mounted on the frame of the machine for movement to a bale-transfer position to place successive bales on a load bed which again is disposed in a generally offset relationship to one side of the bale chamber.

In the arrangements according to U.S. Pat. Nos. 3,272,352 and 4,310,275, the given width of the implement is not efficiently used for accumulating the maximum number of bales in side-by-side relationship.

U.S. Pat. No. 4,215,964 discloses a different form of bale accumulator in which the accumulator is placed symmetrically with respect to the bale chamber of the baler with bales issuing from the bale chamber first being disposed to one side an then to the opposite side of the accumulator on respective side platforms which are pivotable to dump pairs of bales collected thereon. The bales of a pair of bales accumulated and dumped with this accumulator thus are dumped on the ground at spaced apart locations and thus do not form a compact parcel adapted for subsequent mechanical handling.

In all of the aforementioned bale accumulators, the load bed or table is pivotable to assume an inclined position for discharging the bales ot the ground under gravity. However, it is also known from French Patent No. 1,471,621 to provide a fixed load bed on an accumulator. A discharge conveyor is provided on the floor of the load bed and is operable to discharge bales in a rearward direction after a tailgate has been opened.

SUMMARY OF THE INVENTION

It is an object of the present invention to provide a bale accumulator which is of relatively simple construction and yet is able to accumulate a regular parcel of bales including a maximum number of bales for a given width of the machine and to discharge that parcel essentially as an integral unit from the accumulator in a manner suitable for subsequent mechanized handling.

According to present invention there is provided an agricultural bale accumulator comprising a load bed adapted for accumulating thereon a plurality of bales with bales being received successively one after another in a first direction on the load bed; bale-transfer means operable to displace the bales, after receipt on the load bed, across the load bed in a second direction transverse to the first direction and to position these bales in a side-by-side relationship on the load bed thus forming a compact parcel thereof; bale-discharge means operable to discharge a parcel of bales thus accumulated on the load bed to the ground; and bale-turning means for turning each bale through substantially 90° around its longitudinal axis upon receipt on the load bed. The bale-turning means may comprise means for elevating one side of each bale received on the load bed and means operable to tip each bale as it is being elevated whereby each bale is turned through 90° substantially.

DESCRIPTION OF THE DRAWINGS

Bale accumulators constructed in accordance with the various aspects of the present invention will now be described in greater detail, by way of example, with reference to the accompanying drawings, in which:

FIGS. 2, 3 and 4 are schematic rear views of the accumulator and illustrating the modular construction thereof; each Figure showing a different combination of modules. The pattern or patterns of parcels of bales accumulated with, and discharged across the field by the accumulators formed by these various combinations is/are illustrated to the right of these Figures;

FIG. 8 is a partial sectional view taken along the lines VIII—VIII in FIG. 5 and illustrating the main sensor means 140;

FIG. 9 is a schematic side view to a larger scale of the portion of the accumulator indicated at IX in FIG. 1;

FIG. 10 is a sectional view taken along the lines X—X in FIG. 9;

FIG. 13 is a partial sectional view taken along the lines XIII—XIII of FIG. 5;

FIGS. 15, and 17 to 19 are sectional views taken along the lines XV—XV, XVII—XVII, XVIII—XVIII and XIX, XIX in FIG. 14;

FIG. 16 is a partial view taken in the direction of lines XVI—XVI in FIG. 15;

DESCRIPTION OF THE PREFERRED EMBODIMENT

The terms "forward", "rearward", "left" and "right" used in connection with the bale accumulator and/or components thereof are determined with reference to the direction of forward operative travel of the machine and should not be considered as limiting. Also the terms "upper" and "lower" are used principally throughout this specification for convenience and it should be understood that these terms equally are not intended to be limiting.

Figure 1:
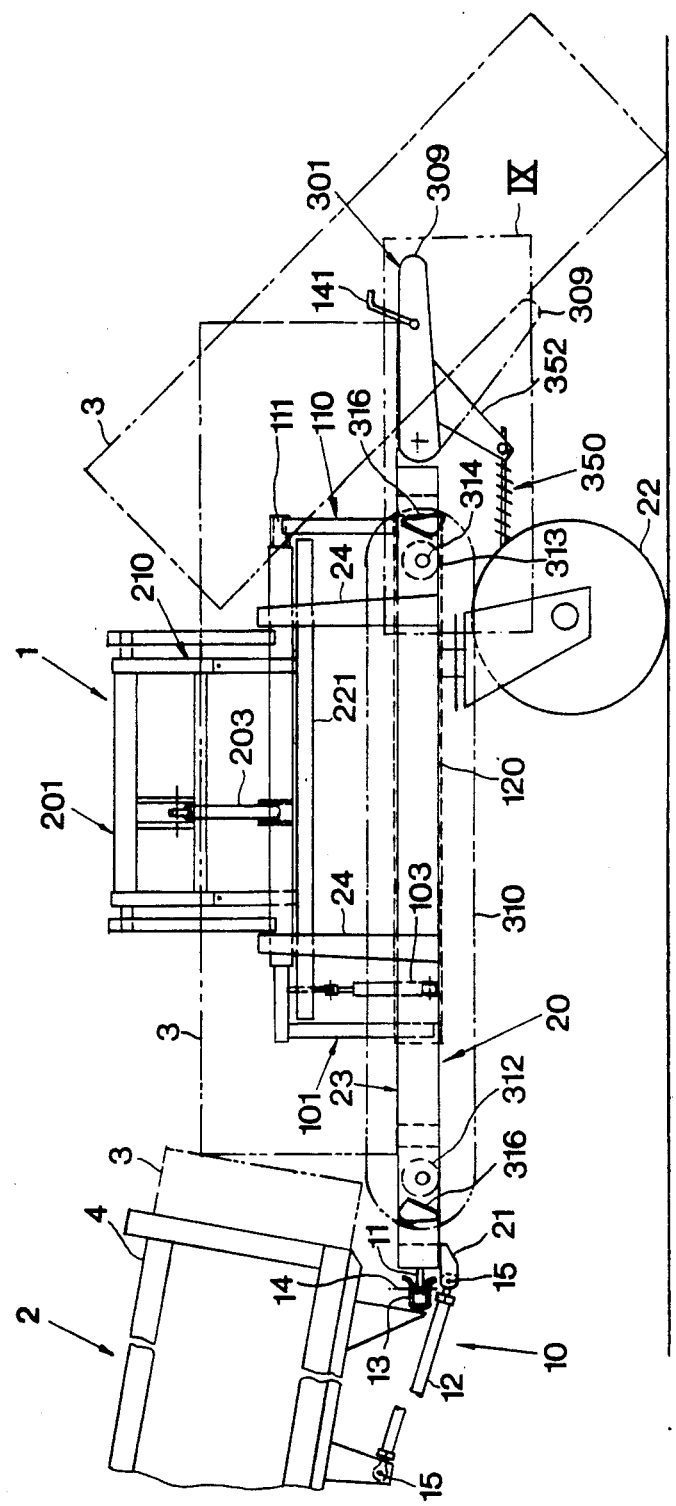
FIG. 1 is a schematic side view of an accumulator according to the invention and which is shown attached to an agricultural baler.
Figure 2:
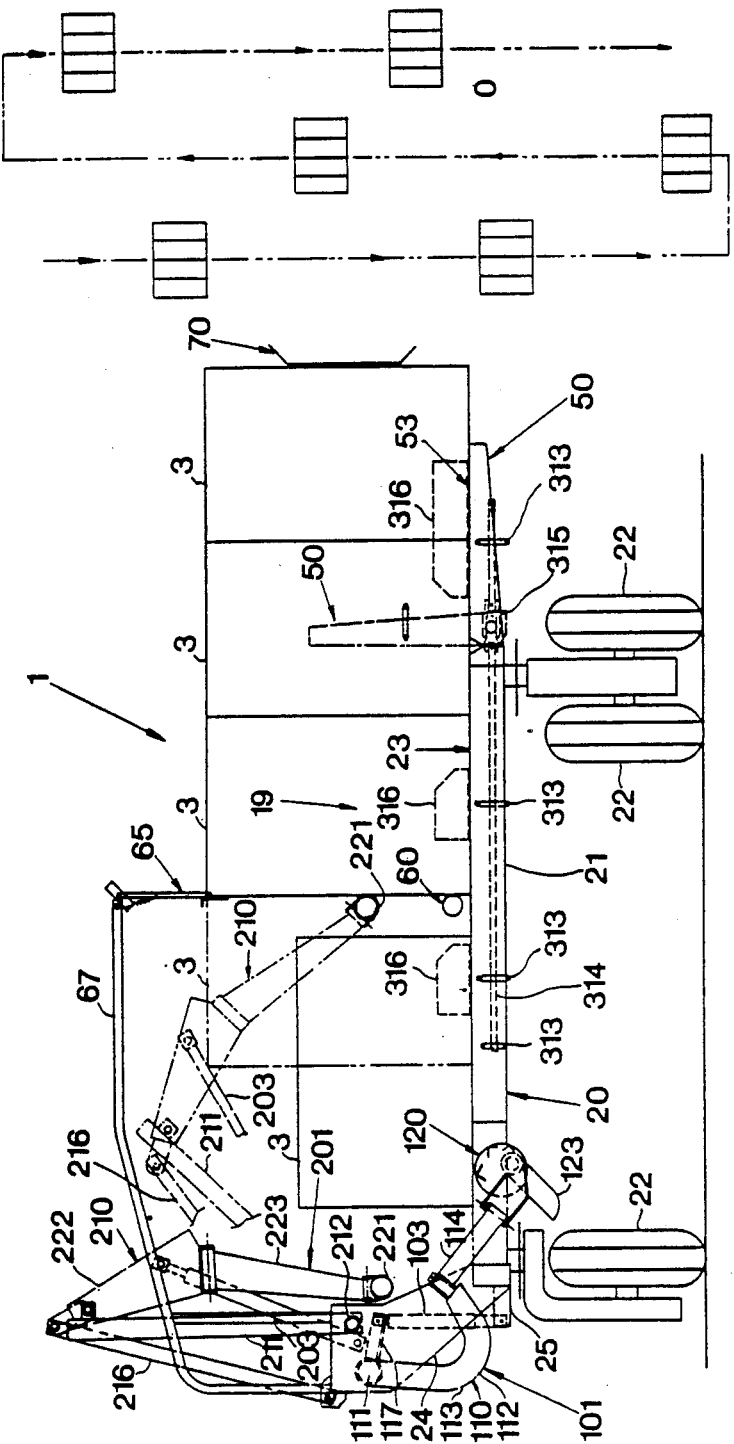
Figure 4:
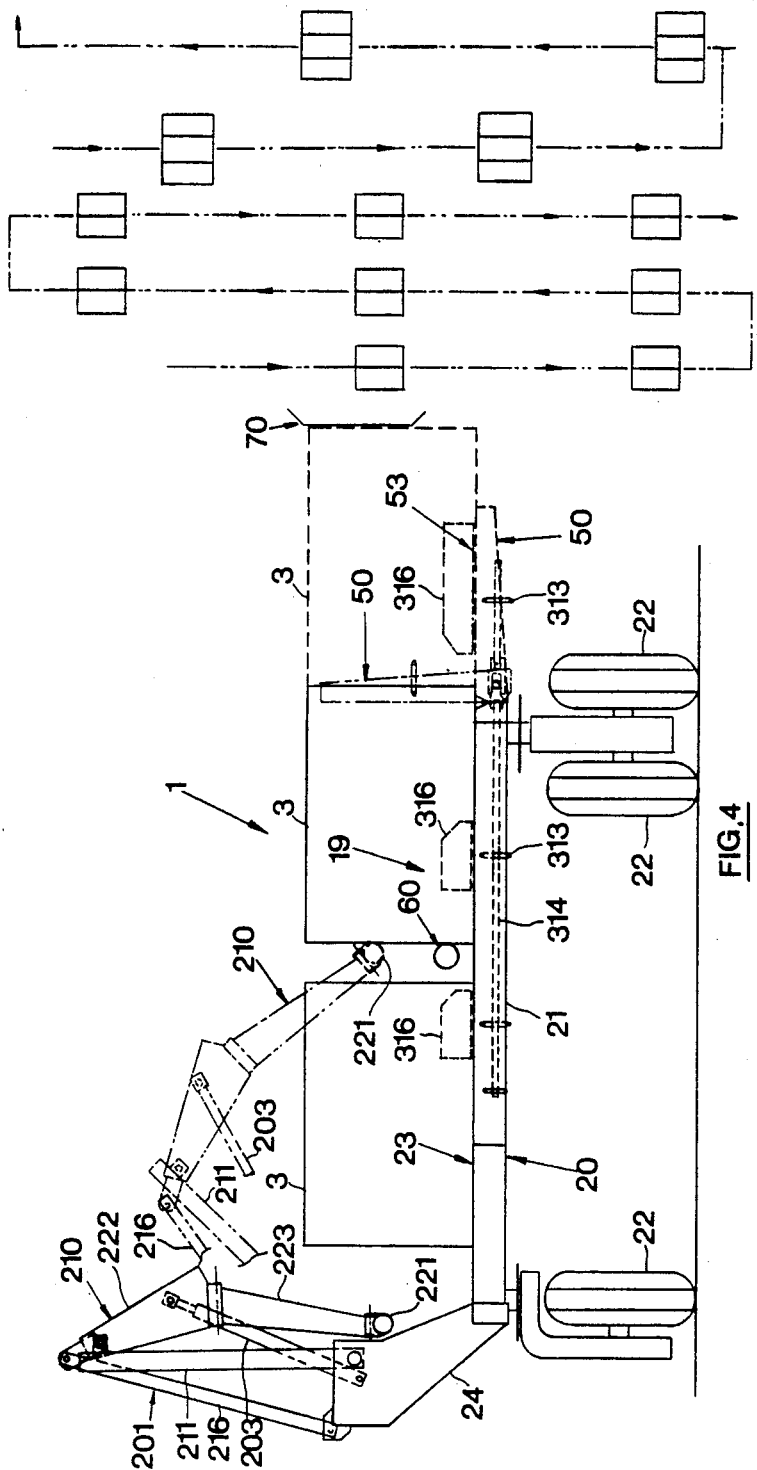
Figure 5:
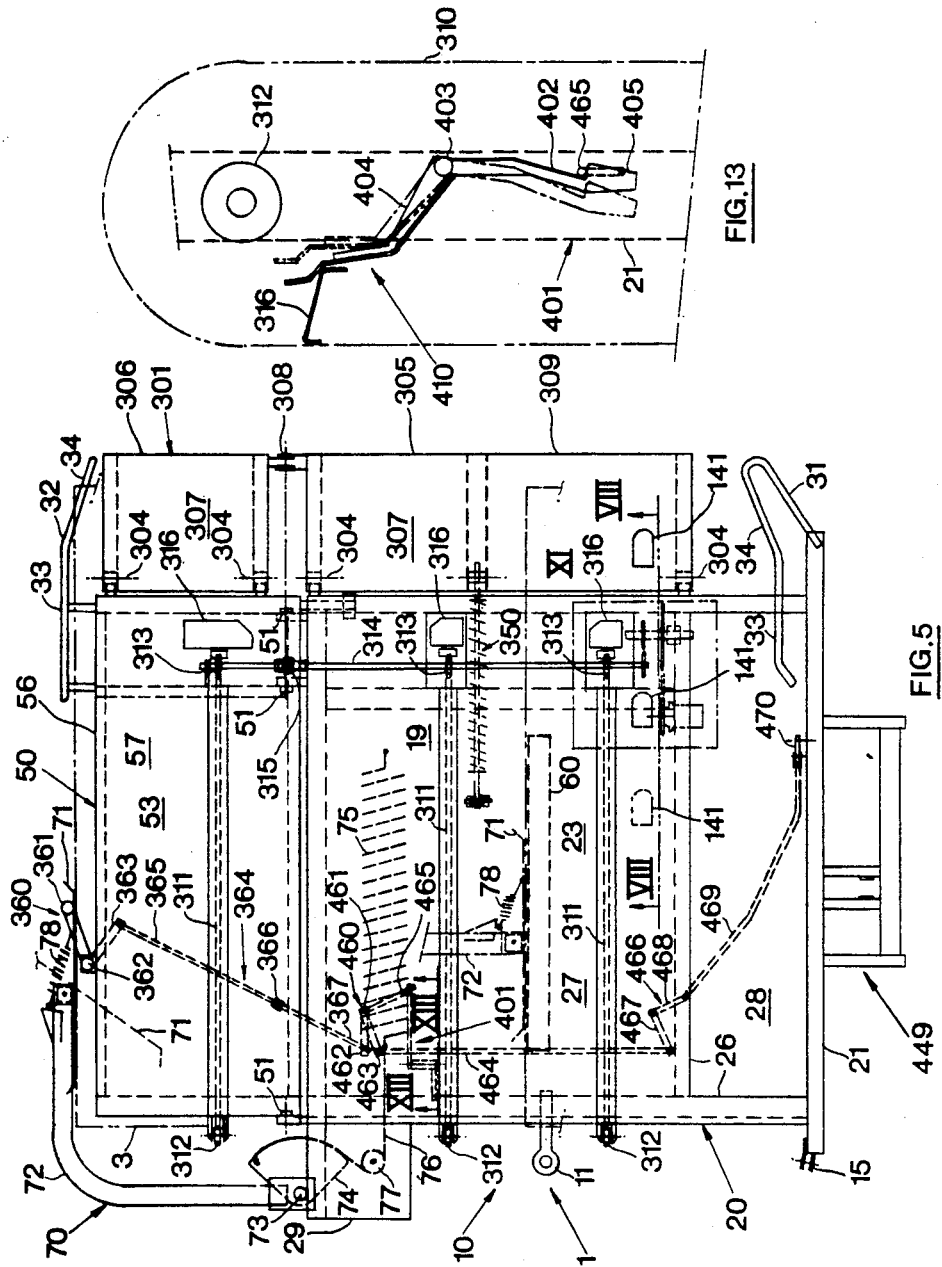
FIG. 5 is a schematic top view, with portions left out for the sake of clarity, of the accumulator combination as shown in FIGS. 1 and 2.

Referring first to the FIGS. 1 to 5, the bale accumulator 1 is of a modular construction and comprises a base module 20 which is shown separately in FIG. 3, an extension module 50 which is shown added to the base module 20 in FIGS. 4 and 5, a bale-dumping module 301 which is part of a bale-discharge mechanism and which is shown in FIGS. 1 and 5, a bale-turning module 101 which is shown in conjunction with the base module 20 and the extension module 50 in FIG. 2 and a bale-transfer module 201 which is shown in conjunction with several combinations of other modules in FIGS. 2, 3 and 4.

The base module 20 comprises a chassis 21 provided with a bale-receiving table 23 and a pair of ground-engaging castor wheels 22. The accumulator 1 is hitched or attached to an agricultural baler 2, which is partially shown in FIG. 1 of the drawings by a coupling device 10 comprising, on the one hand, a ring or eye bolt 11 attached to the chassis 21 and disposed to enter into a socket 13 coupled to the baler chassis and to receive a coupling pin 14 therethough and, on the other hand, a pair of transversely spaced apart tie rods 12 provided at opposite sides of said eye bolt 11. Each tie rod 12 is attached at its opposite ends to the baler 2 and the accumulator chassis 21 by ball joints 15. In an alternative arrangement only one such tie rod 12 is provided. With this form of hitching or connection, the accumulator 1 cannot move in yaw relative to the baler 2 on the one hand while limited movement in the two other main directions is allowed on the other hand. Indeed, the accumulator 1 and the baler 2 can move relative to each other to a limited degree in pitch about the ball joints 15 and the eye bolt 11 and in addition thereto the coupling device 10 allows the accumulator 1 and the baler 2 to move relative to each other about a longitudinal, fore-and-aft axis of the two components. The inability of the baler 2 and the accumulator 1 to move relative to each other in yaw requires that the two-ground-engaging wheels 22 of the accumulator 1 are castor wheels which are pivotable about generally vertical axes. The foregoing arrangement is necessary to guarantee that, in use, the bales 3 emerging from the bale chamber 4 of the baler 2 always are received at precisely the same location on the accumulator 1 by virtue of this accumulator 1 always having the bale receiving portion properly aligned with the bale chamber 4. However, for transport purposes, the bale accumulator 1 should be able to assume, when seen in a horizontal plane, an angled position relative to the pulling baler 2. To this end, the tie rods 12 are removed and the castor wheels 22 are secured in fixed positions relative to the chassis 21 whereby the bale accumulator 1 becomes a conventionally trailed unit.

The base module 20 supports the bale-transfer module 201 which is operable to displace bales 3 transversely on the table 23 and bale-discharge means including the bale-discharge module 301, which is operable to discharge bales 3 to the ground. These components will be described in greater detail hereinafter.

The base module 20 of the bale accumulator 1 can be extended by fitting the extension module 50 which is pivotally attachable at 51 to the chassis 21 of the base module 20. The extension module 50 comprises a table 53 which together with the main bale-receiving table 13 forms a load bed 19 for bales to be accumulated thereon during operation. In as much as the extension module 50 increases the width of the bale accumulator 1, this width can be reduced essentially to that of the base module 20 for transportation purposes merely by pivoting the extension module 50 about the pivots 51 to the generally vertical position which is shown in broken lines in FIGS. 2 and 4.

Considering now the accumulator 1 in operation, it will be seen from FIG. 3 that, when the accumulator 1 is provided in its simpliest form comprising only the base module 20, the bale-discharge means including the bale-dumping module 301 and the bale-transfer module 201, it is operable to receive a maximum of two bales 3 only on the bale-receiving table 23; these two bales 3 sitting on the table 23 on one of their longer sides. As soon as a pair of bales 3 has been accumulated, it is immediately discharged to the ground, whereby the pattern of bales over the field traversed by the baler 2 and accumulator 1 is as indicated at the right-hand side of FIG. 3 of the drawings. This pattern is "random" in the sense that bales 3 will be discharged in pairs as and when they have been accumulated and, as accumulation depends on bale formation which in turn depends upon the amount of crop material being picked up, then the spacing between pairs of bales 3 is variable. However, this "random" discharge of the pairs of bales 3 has to be accepted because, as soon as the second bale 3 has been accumulated on the table 23, the next bale 3 is being formed in the bale chamber 4 of the baler 2 and, in as much as the cycle of bale formation is only of the order of 40 seconds, the accumulated pair has to be discharged immediately in order to avoid any possibility of the next bale 3 being formed interfering with the last bale 3 ejected from the bale chamber 4.

Looking now at FIG. 4 of the drawings which shows the extension module 50 fitted to the base module 20, the width of the load bed 19 is thus increased so that it can accept across its width three bales 3 sitting on their longer sides. With this arrangement, it is possible to discharge pairs of bales 3 in a predetermined pattern over the field being traversed by the baler 2 and accumulator 1 and as is indicated immediately to the right of FIG. 4 of the drawings. However, with this combination of the base module 20 the bale discharge means including the bale-dumping module 301, the bale-transfer module 201 and the extension module 50, it is also possible to accumulate parcels of three bales 3 and to discharge these parcels as indicated at the extreme right-hand side of FIG. 4 of the drawings. It will be seen that the parcels of three bales 3 are discharged "randomly" in the same sense as the parcels of two bales 3 formed when using only the base module 20 and as illustrated in FIG. 3 of the drawings. Again, this is because, once a parcel of three bales 3 has been accumulated, it must be discharged immediately to avoid any interference by the next bale 3 being formed in the bale chamber 4 and emerging therefrom. Accordingly, the combination of the base module 20 and the extension module 50 can be used to discharge two patterns of bales 3, as required by the operator.

The advantage of the "regular" or "in-line" discharge of pairs of bales 3 is that these pairs can be relatively closely disposed in lines across the field, which makes it much easier for subsequent picking up by mechanised means for loading onto transport for hauling to another location. It will be appreciated that the reason why a pair of bales 3 can be discharged at a predetermined point in the field is that an accumulated pair is clear of the next bale 3 being formed in the bale chamber 4 and emerging therefrom and onto the table 23 in view of the extended width of the load bed 19 provided by the extension module 50. With this arrangement, the portion of the discharge means positioned in line with the bale chamber 4 of the baler 2 is rendered inoperative (e.g. by means of a slidable coupling, not illustrated) so that it does not interfere with a third bale 3 being formed and emerging from the bale chamber 4 when this bale discharge means is set in action to discharge a previously accumulated pair of bales 3. It will also be appreciated that this portion of the discharge means will be rendered operative again when it is desired to discharge parcels of three bales 3.

Turning now to FIG. 2, this illustrates how parcels of four bales 3 can be accumulated on the load bed 19 by turning the bales 3 through 90° as they emerge from the bale chamber 4 of the baler 2 and so that they sit on the load bed 19 on their shorter sides. Using this mode of operation, the parcels of four bales 3 have to be discharged immediately after they have been accumulated. As a consequence, this once again gives rise to a "random" pattern of discharged parcels of bales 3 across the field. It will be appreciated that parcels of three bales 3 disposed on their longer sides as well as parcels of two "flat" bales 3 can also be accumulated using the combination of modules 20, 50, 101, 201 and 301. In other words, an accumulator 1 comprising all of its modules can also perform the unloading patterns of the arrangements shown in FIGS. 3 and 4. On top of that, the combination of all available modules also permits the formation of parcels comprising either two or three bales 3 "on edge".

It will be noted from the drawings that, when the extension module 50 is fitted to the base module 20, then an additional castor wheel 22 is provided in order to accomodate the extra load that can be accumulated on the extended load bed 19.

Figure 6:
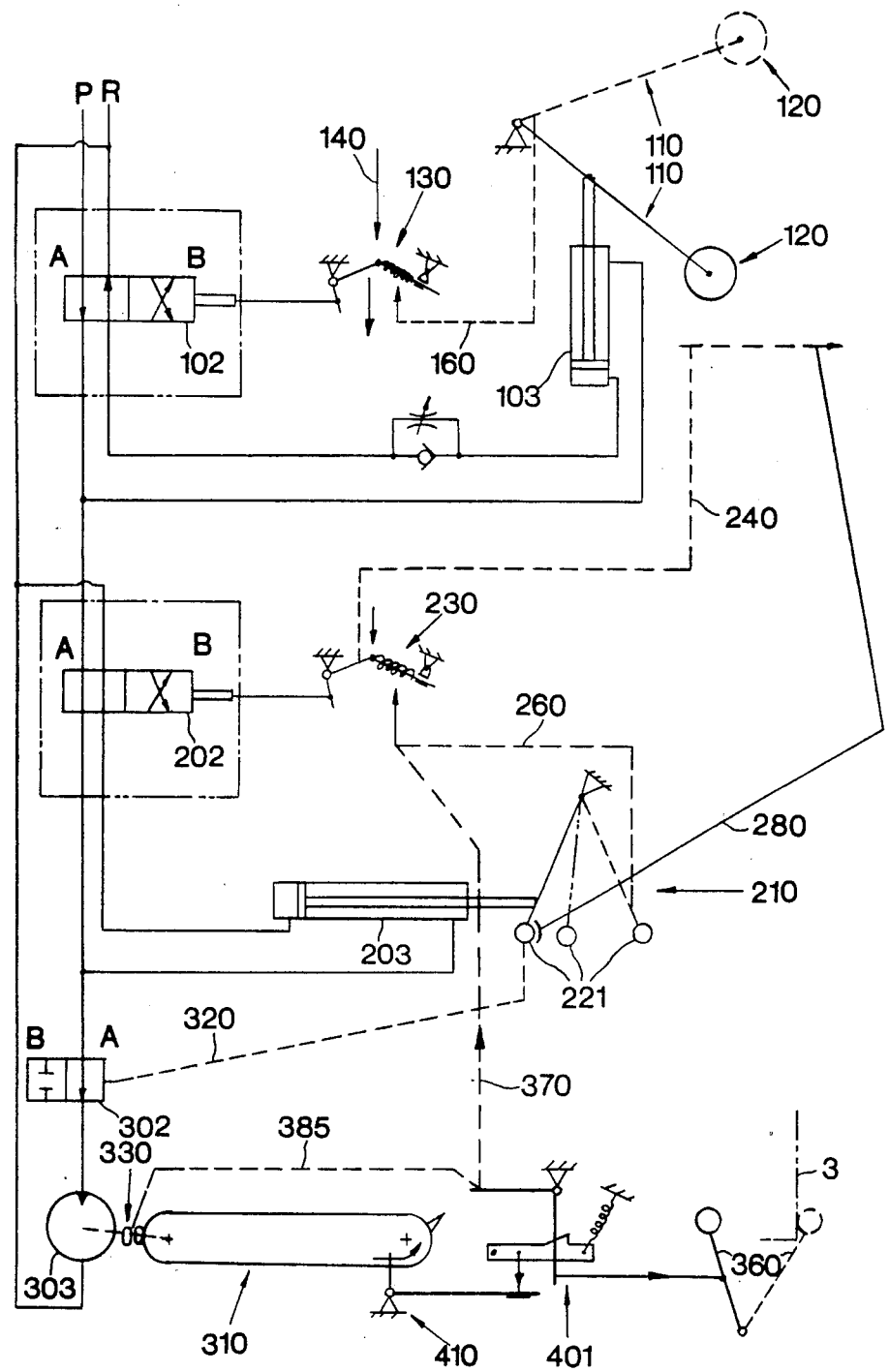
FIG. 6 is a schematic diagram showing the interaction of the hydraulic controls with the mechanical controls of the accumulator of FIG. 1.

Turning now to FIG. 6 of the drawings, the overall operation of the bale accumulator 1 will be described by reference to the interaction of the hydraulic controls and the mechanical controls and this will be followed by a more detailed description of certain of the mechanical components. The description with reference to FIG. 6 will be given on the basis that the bale accumulator 1 has all available modules installed.

Three hydraulic control spool valves 102, 202 and 302 are connected in series and are normally in a position A in which pressure fluid from a pressure line P passes straight through one side of each valve to an hydraulic motor 303 from where it is returned to a return line R. Thus the flow of pressure fluid has no effect other than driving the hydraulic motor 303 when the valves 102, 202 and 302 are in the A position, i.e. the rest position. However, unless a clutch 330 is engaged, this energization of the hydraulic motor 303 also has no effect on any of the machine components.

A main sensor member 141 of the main sensor means 140 (FIGS. 1, 5 and 8) is provided at the appropriate location along the length of the accumulator 1 for detecting the presence of a bale 3 once this bale 3 has completely arrived on the table 23. An over-center device 130 is associated with the main sensor means 140 and the valve 102 in a manner so as to flip over center and change the valve 102 from the A position to the B position when the main sensor means 140 detects the presence of a bale 3. In the B position of the valve 102, pressure fluid is directed to the lower end of the double-acting hydraulic actuator 103 thereby causing this actuator 103 to extend and the bale-turning means 110 to move to its raised position which effects turning of the bale 3 in question through 90° as will be described in greater detail hereinafter. As the actuator 103 extends, fluid from the upper end thereof passes via valve 102 directly to the return line R. Also, the flow of pressure fluid through the motor 303 is interrupted at that moment.

When the bale-turning mechanism 110 reaches its uppermost position as shown in broken lines in FIG. 6, a linkage mechanism 160 resets the over-center device 130 whereby it is flipped back to its original position (the position shown in FIG. 6) and thus changes the valve 102 back to the position A in which the bale-turning mechanism 110 is permitted to return to its home position by the gravity forces acting thereupon. During this return movement of the bale-turning mechanism 110, pressure fluid is directed to the top of the actuator 103 and fluid from the bottom end of the actuator 103 is drained via valve 102 into the return line R.

During the lifting movement of the bale-turning mechanism 110 a triggering mechanism, schematically represented in FIG. 6 by broken line 240 is "loaded". This triggering mechanism 240 is operatively associated with an over-center device 230 which itself is operatively associated with the valve 202. Said triggering device 240 is operative, when the bale-turning mechanism 110 reaches its home position, to flip the device 230 over center. This, in turn, causes the valve 202 to shift to the B position whereby the bale-transfer cycle is initiated.

Figure 7:
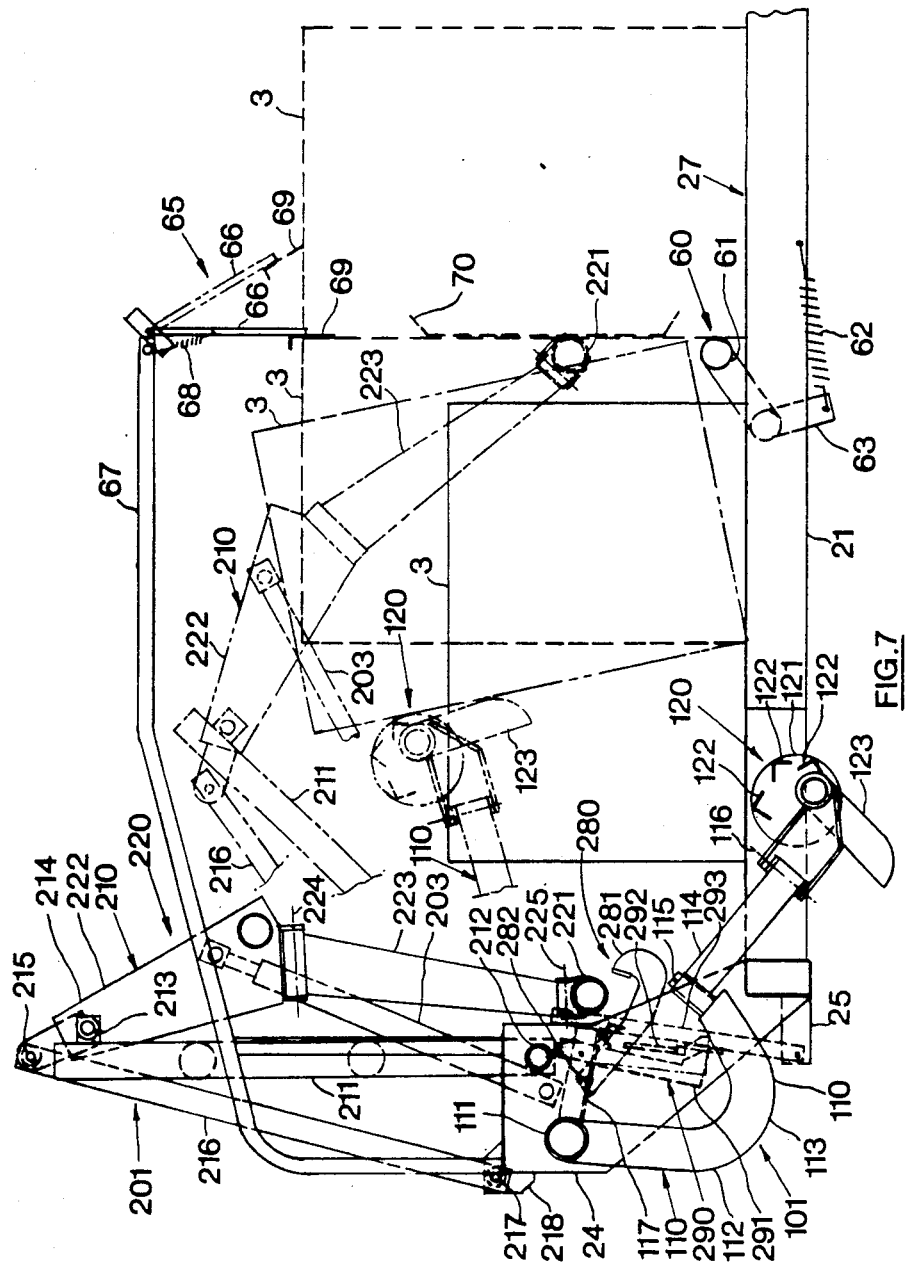
FIG. 7 is a rear view similar to FIG. 2 but to a larger scale and illustrating with more details the bale-turning means 110 and bale-transfer means 210 of the accumulator according to the present invention.

It still should be remarked that a mechanical latch 280 is associated with the bale-transfer means 210 and which is operable to lock the bale-transfer means 210 in its home position while the bale-turning means 110 is operated. This mechanical latch 280 is disengaged or retracted when the bale-turning means 110 is in its home position. Similarly, a further mechanical latch 290 (FIG. 7) which is operated by the bale-transfer means 210, positively locks the bale-turning means 110 in the home position when the bale-transfer means 210 is operated. This further mechanical latch 290 is disengaged or retracted by the bale-transfer means 210 when the latter is in its home position. Although strictly speaking, these mechanical latches 280 and 290 are not needed in as much as, under normal circumstances, the hydraulic system operates the bale-turning means 110 and the bale-transfer means 210 only sequentially, it nevertheless provides an extra safety which positively prevents interference between the bale-turning and bale-transfer means 110 and 210 and which otherwise possibly might occur when e.g. the hydraulic system would function incorrectly or partially fail.

Returning to the bale-transfer cycle and considering the point where the over-center device 230 has been flipped over by the triggering mechanism 240 and, as a consequence, the valve 202 has been shifted to its B position, pressure fluid is directed to the left-hand end of the actuator 203 of the bale-transfer means 210 to extend the same so as to operate said bale-transfer means 210 whereby a previously turned bale 3 is pushed transversely across the accumulator table 23 by a distance equal to a bale width (e.g. 60 cm). Pressure fluid at the other side of the plunger of the actuator 203 is drained via valve 202 to the return line R.

When the bale-transfer means 210 has moved to its maximum extent, a resetting of the over-center device 230 is effected via a linkage 260 whereby the valve 202 is moved back to the A position in which pressure fluid is directed to the right-hand end of the actuator 203 and thus drives the transfer mechanism 210 back to the home position.

It should be noted that a further linkage 320 is associated with the bale-transfer mechanism 210 and the valve 302 of the bale-discharge means 310 for shifting this valve 302 to the B position when the bale-transfer means 210 is in any other position than its home position and for thereby interrupting the flow of pressure fluid to the motor 303 so that, during the entire cycle (i.e. both the bale transfer part and the return part) of the bale-transfer means 210 sufficient pressure is available to operate said bale-transfer means 210.

Looking now at valve 302, this is changed, as already said, to the B position as soon as the bale-transfer means 210 moves from the home position. In the B position of the valve 302 the hydraulic motor 303 is blocked from any pressure fluid and this situation pertains until the bale-transfer means 210 returns to the home position, whereupon the valve 302 is changed back to the A position in which pressure fluid can then be applied to the motor 303 which is accordingly rendered operative. However, at this time the clutch 330 is inoperative so that an unloading conveyor 310 with which the clutch 330 is operatively coupled, is not rendered operative. This is the situation in as far as the first, second and third bales 3 are concerned and which have been turned and then pushed across the load bed 19 assuming that the accumulator 1 indeed is set up to handle four bales 3. In general, the clutch 330 is inoperative for all of the bales 3 except the final one as will now be explained.

A full load sensor 360 is provided at the side of the load bed 19 opposite to the side thereof facing the bale-turning and bale-transfer means 110 respectively 210. This sensor 360 is operatively associated via linkages 370 and 385 with both the over-center device 230 and the clutch 330 in a manner, when it is acted upon by a bale on the load bed 19, to return the over-center device 230 to the raised home position and to engage the clutch 330. This normally occurs when a fourth bale 3 has been turned through 90° on the load bed 19 and after it is displaced sideways to join the parcel of three bales 3 previously already accumulated on said load bed 19 and after the parcel of four bales 3 thus accumulated is shifted over a relatively short distance. In other words, the bale-transfer means 210 is returned to the home position without first reaching its fully extended position. The intermediate position assumed by the bale-transfer means 210 at the moment the movement thereof is reversed during the fourth cycle, is illustrated in FIG. 6 in chain lines.

After the bale-transfer movement of the bale-transfer means 210 is interrupted and reversed in the way as described hereabove, the clutch 330 is engaged via the linkage 385. This causes the motor 303 to drive the bale-discharge conveyor 310 which results in the discharge to the ground of the parcel of bales 3 previously accumulated on the load bed 19. The operative coupling of the full load sensor 360 to the linkages 370 and 385 further also includes a latch 401 which, upon actuation of the sensor 360 becomes operative to hold the linkages 370 and 385 in the actuating positions until this latch 401 is released again by the bale-discharge conveyor 310 upon the completion of the bale-discharge cycle and whereby the clutch 330 is disengaged thus interrupting the drive to the conveyor 310 and the linkage 370 is retracted so that the over-center device 230 can be flipped over center again when next actuated by the triggering mechanism 240.

Having so far described the accumulator 1 in general terms, the various components of a preferred embodiment will now be described in more details.

Looking first more closely at the bale-turning mechanism 110 (FIGS. 2 and 7), this is formed by a sub-assembly 101 which is mounted on two fore-and-aft spaced apart supports 24 which are part of the chassis 21. The bale-turning mechanism 110 is in the form of a generally rectangularly shaped structure, one side of which is formed by a fore-and-aft pivot shaft 111 pivotally mounted on the supports 24. The side of the rectangular shape which is parallel to the pivot shaft 111 is formed by a bale-engaging member 120 comprising a plurality of discs 121 which support around a portion of the periphery a number of inverted angle iron members 122 which provide a relatively aggressive action on the bales 3 when engaged thereby. The bale-engaging member 120 further also comprises an extension element 123 which is oriented generally downwardly. The third and fourth sides of the rectangularly shaped structure are formed by arms 112 which extend from the pivot shaft 111 and which each comprise a bent portion 113 fixedly connected at one end to the pivot shaft 111 and a straight portion 114 interconnecting the bent portion 113 and the corresponding end of the bale-engaging member 120 via pivots 115 and 116. These pivots 115 and 116 allow the bale-engaging member 120 to fold back in case there would be a malfunctioning of the machine resulting in said member 120 being positioned in the path of a bale 3 emerging from the bale chamber 4 and arriving on the table 23. Spring means (not shown) permit this folding back of the bale-engaging member 120 when necessary and hold said member 120 in the extended position under normal operational conditions. The hydraulic actuator 103 (FIG. 2) extends between a support 25 on the chassis 21 and a bracket 117 fixedly secured to the pivot shaft 111 and is operable to move the bale-turning means 110 between the retracted home position shown in full lines in FIG. 7 and the extended bale turning position partially shown in broken lines in the same Figure.

The mechanical latch 280 for the bale-transfer means 210 to which reference already has been made hereabove, is formed by a hook 281 which is pivotally mounted at 282 on one of the supports 24 and which is engageable by the bracket 117 when the actuator 103 is fully retracted, i.e. when the bale-turning means 110 is in the home position. In this home position of the bale-turning means 110, the latch 280 is urged to its releasing position (shown in FIG. 7) opposite to the force of a spring (not shown) acting thereon. This spring urges the latch 280 to an operative position for locking the bale-transfer means 210 in the home position as soon as the bale-turning means 110 is moved away from the home position.

The pivot shaft 111 further also has fixedly attached thereto arms 161 and 241 (FIG. 14) which are part of respectively the reset linkage mechanism 160 and the triggering mechanism 240 already mentioned and which will be described in more details hereinafter.

Referring now to FIGS. 2 to 4 and 7, the bale-transfer means 210 will be described in greater detail. This mechanism comprises a pair of arms 211 which are fixedly attached at one end to a common fore-and-aft pivot shaft 212 which itself is pivotally mounted between the supports 24 of the accumulator chassis 21. The arms 211 pivotally support at their other ends a further fore-and-aft extending pivot shaft 213 which is part of a generally rectangularly shaped pusher member 220 which further also comprises a bale-engaging rod 221 extending parallel to the pivot shafts 212 and 213. The rod 221 and the pivot shaft 213 are interconnected by fore-and-aft spaced apart arms 214 which extend over a short distance beYond the pivot shaft 213 for pivotally receiving at 215 further rods 216 which in turn are pivotally attached at their other ends at 217 to brackets 218 secured to the supports 24. The distance between each pivot 217 and the pivot shaft 212 is roughly twice the distance between each pivot 215 and the pivot shaft 213. The double-acting hydraulic actuator 203 extends between one of the supports 24 and a corresponding arm 214 of the pusher member 220.

With this geometrical arrangement, when the actuator 203 is extended, the bale engaging rod 221 moves substantially linearly so as to push a bale 3 across the accumulator table 23 without substantially sliding relative thereto. The fully retracted or home position and the fully extended operative position of the bale-transfer means 210 are illustrated respectively in full lines and broken lines in FIG. 7.

Similarly as the arms 112 of the bale-turning mechanism 110, also the arms 214 of the bale-transfer mechanism 210 consist of two portions 222, 223 with the portions 222 being fixedly attached at one end to the common pivot shaft 213 and being pivotally coupled at their other ends via pivots 224 to the second portions 223 which, in turn, are coupled to the bale-engaging rod 221 via further pivots 225. These pivots allow the bale-engaging rod 221 to fold back in case there would be a malfunctioning of the machine whereby said rod 221 would be positioned in the path of a bale 3 emerging from the bale chamber 4 and arriving on the table 23. Spring means (not shown) permit this folding back of the bale engaging rod 221 when required and tend to hold said rod 221 in the extended position under normal operating conditions.

The pivot shaft 212 of the bale-transfer means 210 also has fixedly attached thereto a plate member 261 (FIG. 14) which is part of the reset mechanism 260 to which reference has already been made and which will be described in further details hereinafter.

The accumulator 1 further also comprises a mechanical safety latch 290 which locks the bale-turning means 110 in the home position when the bale-transfer means 210 is operated. This safety latch 290 thus has a similar function as the latch 280 which locks the bale-transfer means 210 in the home position when the bale-turning means 110 is operated. This mechanical safety latch 290 comprises a latching hook 291 which is pivotally mounted on the bracket 117 of the bale-turning means 110 and which is urged by a spring (not shown) in the direction for latching engagement with a stop 292 on the chassis 21. This latching hook 291 is displaced in the direction opposite to the spring force by a pivot lever 293 upon engagement thereof by the bale-engaging rod 221 when in the home position. In other words, as soon as the bale-engaging rod 221 is moved away from the home position, the pivot lever 293 is permitted to pivot in a direction enabling the latching hook 291 to move to its operative position for engagement with the stop 292 on the chassis 21 whereby the bale-turning means 110 thus is positively locked in the home position.

Considering now the load surface in more details, it will be seen from FIG. 5 that it basically is formed by the base module 20, the extension module 50 and the bale-dumping module 301.

The base module 20 comprises a rectangular subframe 26 with a support surface 27 which extends substantially across the entire subframe 26 except for the left-hand portion thereof which is left open at 28 for receiving the bale-engaging member 120 therethrough when the bale-turning means 110 moves to the home position. This support surface 27 is positioned offset relative to the bale chamber 4 of the baler 2 pulling the accumulator 1 so that a bale 3 emerging from said bale chamber 4 is received partly supported on the support surface 27 and partly overlapping the opening 28 at a location above the bale-engaging means 120 when the bale-turning means 110 is in the home position.

The extension module 50 comprises a further subframe 56 with a support surface 57 and which is pivotally attached via pivots 51 to the base module 20. The extension module 50 can be placed in a retracted upright transport positon and a horizontal operative position. Appropriate latching means are provided for holding the extension module 50 in the selected position.

The bale-dumping module 301 equally comprises a support surface 307 which is pivotally mounted via pivots 304 to the rear edges of the base module 20 and the extension module 50 and which is held in a horizontal bale-receiving position by a suspension mechanism 350 to be described in more details hereinafter and which, under influence of gravity forces, releases the support surface 307 to permit it to flip down and to dump a parcel of bales 3 as a compact single unit to the ground. It will be seen in FIG. 5 that the dumping module 301 in fact comprises two portions 305 and 306 which equally are pivotally coupled to each other at 308; this pivotal coupling being necessary to permit placing the accumulator 1 in the transport position with the extension module 50 and the portion 306 in the upright position. It will also be appreciated that the dumping module 301 can flip downwardly only when the extension module 50 and the portion 306 are in the horizontal position.

The base module 20 and the extension module 50 are provided with stationary bale guide members 31, 32 at their opposite sides, which project above the level of the load surface and which are designed and positioned to assist in holding tightly together in compact form during the bale-dumping cycle a parcel of bales 3 previously accumulated on the accumulator 1. To this end, the guide members 31, 32 comprise forward parallel portions 33 and rearward portions 34 which taper towards each other when seen in the rearward direction. During the bale-dumping operation, accumulated bales 3 are confined between the parallel portions 33 and are urged towards each other by the inclined portions 34.

The accumulator 1 further also comprises three bale-conveyor chains 311 which extend in a fore-and-aft direction at transversely spaced apart intervals across the width of the base module 20 and the extension module 50. The chains 311 are mounted on forward idler sprockets 312 and rearward drive sprockets 313. The drive sprockets 313 are mounted on a drive shaft 314 which extends generally at the rear end of the base module 20 and the extension module 50 across the width thereof. The drive shaft 314 comprises a universal joint 315 which is aligned with the pivots 51 of the extension module 50 so as to permit pivotal movement of the extension module 50 between the transport and operative positions. A drive clutching mechanism 330 is coupled to the left hand end of the drive shaft 314 and will be described in more details hereinafter.

Each conveyor chain 311 has a pair of bale-engaging members 316 which are spaced 180° apart. In the rest position of the bale conveyor means 310, the bale-engaging members 316 are positioned below the level of the load surface at the forward and rearward edges of the base module 20 respectively the extension module 50. In other words, the bale-engaging members 316 are in retracted positions out of the path of the bales 3 emerging from the bale chamber 4 of the baler 2, respectively of the bales 3 being transferred across the surface of the table 23 and the support surface 57 of the extension module 50.

The bale accumulator 1 further also comprises bale stabilizing means which basically consist of three major components and which cooperate with each other and with the load bed 19.

A first bale-stabilizing means 60 has a bale-engaging member 61 which extends generally in the fore-and-aft direction at an offset location to the right of a bale 3 as it emerges from the bale chamber 4 and which is movable between an extended operative position above the table surface 27 and a retracted position therebelow. Spring means 62 extending between an arm 63 of the stabilizing means 60 and the chassis 21 urge the member 61 to the extended position and permit said member 61 to retract below the surface 27 when the bale-transfer means 210 pushes a bale 3 transversely across the table 23 to the other side of the bale-engaging member 61. The relative position of the first bale-stabilizing means 60 is so that, upon the bale-transfer means 210 reaching its fully extended position, a bale 3 transferred thereby is pushed fully beyond the bale-engaging member 61 of the stabilizing means 60 whereby this member 61 can resume its extended position prior to the bale-transfer means 210 starting to return to its home position.

The second bale-stabilizing means 65 has a bale-engaging member 66 which is positioned generally vertically above the bale-engaging member 61 of the first bale-stabilizing means 60 at a height above the table 23 generally corresponding to the height of the bales 3 to be handled. The bale-engaging member 66 is pivotally mounted on a pair of mounting arms 67 which extend overtop across the area where a bale 3 emerging from the bale chamber 4 is received and which are fixedly coupled to the chassis members 24. Spring means 68 urge the bale-engaging member 66 into a generally vertically downwardly extending orientation and permit said member 66 to swing to the right when a bale 3 is transferred therebelow across the table 23. The bale-engaging member 66 has fingers or tines 69 which, under influence of the spring means 68, enter into the surface of a bale 3 positioned therebelow and which, in cooperation with the bale-engaging member 61 of the first stabilizing means 60, effectively prevent this bale 3 from being displaced back to the left once it has been pushed beyond the first bale-stabilizing means 60. The second bale-stabilizing means 65 further also prevent a bale 3 held thereby from tipping back to the left. This second bale-stabilizing means 65 may be dispensed with when the accumulator 1 is set to receive bales 3 "flat" as is shown in FIGS. 3 and 4, i.e. when the accumulator 1 is set to skip the bale-turning cycle.

The first and second bale stabilizing means 60, 65 further also cooperate with a third bale-stabilizing means 70 which is provided generally at the right-hand side of the accumulator 1 and which operatively engages the side of the first bale 3 on the table 23 and facing to the right. This third bale stabilizing means 70 comprises a bale-engaging member 71 which is pivotally mounted on a support arm 72 which itself is pivotally mounted at 73 to a forward portion 29 of the chassis 21. The pivot 73 is extended below the level of the table 23 and has a sector 74 affixed thereto. Spring means 75 are attached at one end to the chassis 21 and are coupled at the other end via a chain 76 to the sector 74. The chain 76 extends around a sprocket 77 and engages the outer surface of the sector 74. Further spring means 78 urge the bale-engaging member 71 in the position shown in broken lines in FIG. 5 and permit said member 71 to pivot to the full line position upon engagement by a bale 3.

The spring means 75 are rather strong and urge the third bale-stabilizing means 70 toward the broken line position shown in FIG. 5. In operation, bales 3 are transferred by the bale-transfer means 210 the one after the other beyond the first and second bale-stabilizing means 60 and 65 opposite to the action of the third bale-stabilizing means 70 and thus, the or each bale 3 on the load bed 19 is well stabilized against falling over or sliding due to general vibration and/or the baler 2 and accumulator 1 working on inclines. At the same time, all three bale-stabilizing means 60, 65 and 70 also cooperate to firmly hold together in a compact parcel the bales 3 which are positioned therebetween. The same also applies when the bale-discharge means 310 are made operative and start discharging a parcel of bales 3 in a rearward direction. As the parcel of bales 3 are pushed off the accumulator 1, the bale-guide members 31, 32 also contribute to holding the parcel tightly together.

The bale-stabilizing means 60, 65 and 70 should not obstruct the discharge of parcels of bales 3. The bale-stabilizing means 60 and 70 clearly do not present a problem in this respect by virtue of the general orientation of the bale-engaging members 61 and 71 thereof when in the operative position. As far as the second bale-stabilizing means 65 is concerned, the bale-engaging member 66 thereof may be provided at an angle relative to the fore-and-aft direction so that the movement of a parcel of bales in the discharge direction causes said bale-engaging member 66 to pivot in a direction opposite to the action of the spring 68 thus permitting the discharge of the parcel. Alternatively as in addition thereto, the tines 69 of the bale-engaging member 66 may be inclined in the discharge direction to permit the discharge of a parcel of bales 3 in this direction.

With reference to FIGS. 9 and 10 the suspension mechanism 350 for the bale-dumping table 309 now will be described in more details. Downwardly extending supports 351 and 352 are affixed to the lower sides of the chassis 21 and the dumping table 309 respectively. A suspension rod 353 is pivotally coupled at 354 to the support 352 and is slidably received through a pivotal mounting 355 on the support 351. A suspension spring 356 extends between a stop 357 on the rod 353 an the pivotal mounting 355 and is dimensioned so as to urge the table 309 to the horizontal position when no bales 3 are positioned thereon.

A latch 340 is provided at the free end of the suspension rod 353 and comprises an apertured latch plate 341. Spring loaded latching balls 342 supported on the chassis 21 are disposed to cooperate with the aperture 343 in the latch plate 341. The latching balls 342 are received in bores 344 which are fixedly secured to the chassis 21 and springs 345 act on these balls 342 via pins 346. When the bale-dumping table 309 is free to swing to its horizontal position under influence of the action of the spring 356, the latching plate 341 is shifted so as to permit the balls 342 to snap in the bore 343 whereby the bale-dumping table 309 is thus held in its horizontal position. However, when bales 3 are pushed rearwardly over the bale-dumping table 309, the load on the latch 340 increases and, at a given load, the balls 342 can no longer hold the latch plate 341 which thus is released and whereby the bale-dumping table 309 is permitted to abruptly flip downwardly. This is advantageous in as much as it contributes in dumping a compact parcel of bales 3 as a solid single unit to the ground. After a parcel of bales 3 is discharged to the ground, the spring 356 is operable to flip the dumping table 309 back to the horizontal position and to reengage the latch 340.

It will be appreciated that the latch 340 basically is only load dependent and is not influenced to any substantial degree by the accumulator 1 operating on slopes. Also once the latch 340 is released, only minimal frictional forces are present between the balls 342 and the latch plate 341. These limited frictional forces do not interfere with the proper operation of the dumping table 309.

Figure 11:
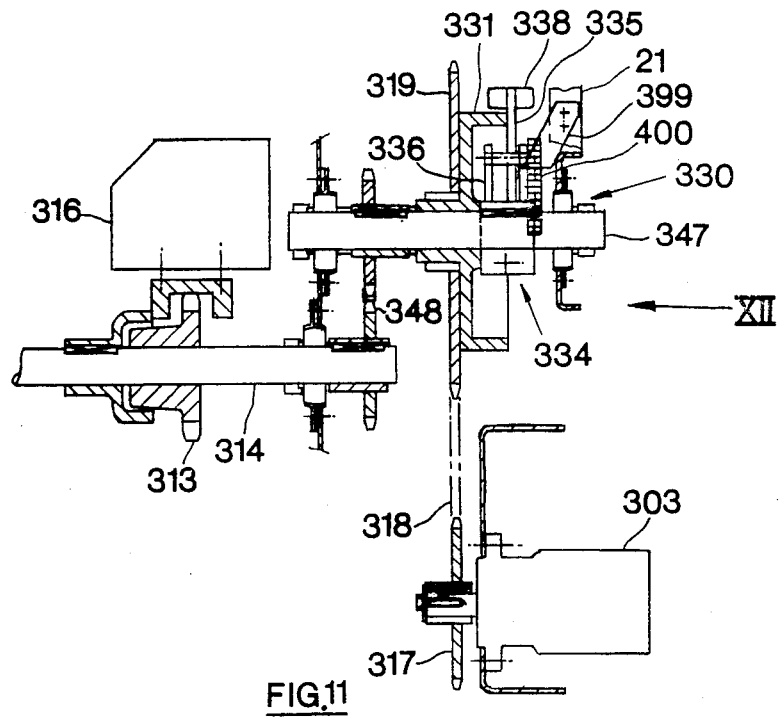
FIG. 11 is a partial sectional view, to a larger scale, of the components indicated at XI in FIG. 5.
Figure 12:
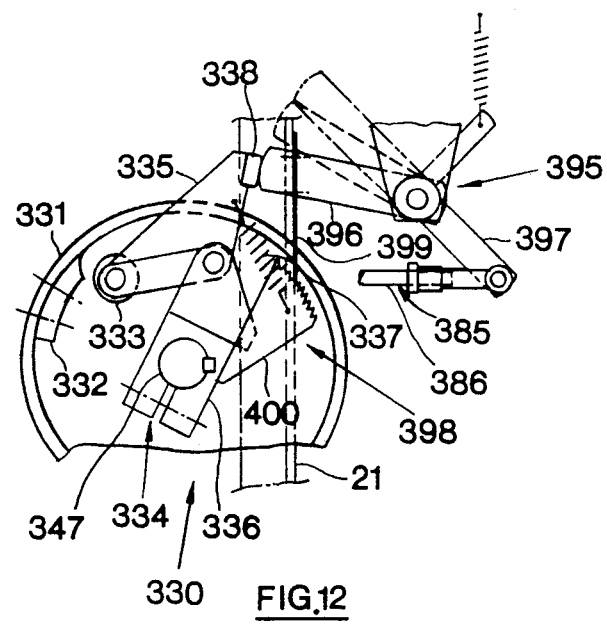
FIG. 12 is a partial end view taken in the direction of arrow XII in FIG. 11.

Turning to FIGS. 11 and 12, the clutch 330 will now be described in more details. The hydraulic motor 303 is provided with a sprocket 317 which is drivingly coupled via a chain 318 and a further sprocket 319 to the outer member 331 of the clutching mechanism 330 and which is freely rotatably mounted on an intermediate shaft 347. The outer clutching member 331 is hub shaped and comprises an inner cam 332 which is disposed to engage with a roller 333 of an inner clutching member 334 which itself is keyed on the intermediate shaft 347. The roller 333 is rotatably mounted on a clutching lever 335 which itself is pivotally mounted on a bracket 336 keYed on the shaft 347 and upon which acts a spring 337 for urging the roller 333 within the path of the cam 332. The clutching lever 335 further also comprises an abutment member 338 which may engage with an arm 396 of a triggering mechanism 395 which is pivotally mounted on the chassis 21 and which is coupled via a further arm 397 to the linkage 385 already referred to hereabove.

In operation and when the hydraulic motor 303 is driven, driving power is transmitted via the chain-and-sprocket transmission 317, 318 and 319 to the outer clutching member 331 which thus is rotated around the shaft 347 without driving this shaft 347 in as much as the abutment member 338 of the clutching lever 335 engages the arm 396 whereby the roller 333 is retracted from the path of the cam 332 on the outer clutching member 331. When subsequently the linkage 385 is actuated and thus the arm 396 is pivoted upwardly (as seen in FIG. 12), the abutment member 338 is released thus permitting the spring 337 to pivot the clutching lever 335 to the clutching position. As a consequence, the roller 333 is moved in the path of the cam 332 and the outer clutching member 331 is caused to transmit rotational power to the inner clutching member 334 thus driving the intermediate shaft 347. This motive power is transmitted via the chain-and-sprocket transmission 348 to the unloading conveyor shaft 314 whereby the bale-discharge conveyor chains 311 are set in motion. This drive continues until one of the bale-engaging members 316 engages the reset mechanism 410 (FIG. 6) causing the arm 396 to pivot back to the declutching position, i.e. to the position wherein the arm 396 is pivoted in the path of the abutment member 338. Upon the abutment member 338 engaging the arm 396 the roller 333 is retracted from the path of the cam 332 and thus the drive to the bale discharge conveyor means 310 is disengaged. Thus, between the engagement and disengagement of the clutch mechanism 330, the bale discharge conveyor means 310 is driven so that the bale-engaging members 316 positioned at the forward end of the table 23 are moved to the rearward end of the table 23 and those which were positioned at the rearward end of the table 23 are moved to the front, thus unloading one parcel of bales 3 and resetting the bale-discharge conveyor means 310 ready for discharging the next parcel of bales 3 still to be accumulated on the load bed 19.

The clutching mechanism 330 further also comprises a ratchet type of locking device 398 consisting of a leafspring 399 secured to the chassis 21 and disposed to engage with the teeth of a toothed segment 400 secured to the bracket 336. The leafspring 399 and the teeth of the segment 400 cooperate in a manner to permit rotational movement of the driven clutching member 334 in the normal drive direction and to prevent rotational movement in the opposite direction. Such reverse movement eventually could be induced, in case no precautions would be taken, by inertia forces upon the disengagement of the clutching mechanism 330; this declutching, in practice, being rather abrupt. Such reversal of the movement of the inner clutching member 334 and thus also of the bale-discharge conveyor means 310 must be prevented to ensure that the bale-discharge conveyor means 310 always returns to the appropriate start or home position.

Turning to FIG. 8 and to the FIGS. 13 to 19, the various mechanical controls of the accumulator 1 will now be described in more details. It is remarked in this respect that the first function (i.e. normally the turning of a bale 3 as it arrives on the table 23) is triggered by a main sensor 140 and that all subsequent functions are triggered in logical consecutive order by end-of-stroke sensors actuated by the next preceding functions. It will also be remarked that the controls may be set to skip the first function, i.e. to skip the bale-turning step. In this situation the main sensor 140 is disposed to trigger the bale-transfer step without first triggering the bale-turning step and whereafter all further consecutive steps again follow automatically in a logical order by the consecutive actuation of various end-of-stroke sensors.

Referring now particularly to FIG. 8, the main sensor 140 will be seen. It should be remarked here that the accumulator 1 should be able to accomodate bales of different lengths as may be obtained by adjusting the bale length control of the baler. It should also be remarked that, of course, the main accumulator functions (i.e. bale-turning and bale-transferring) may not be initiated until a bale 3 has left the bale chamber 4 of the baler 2 completely.

To this end, the main sensor 140 on the accumulator 1 comprises a sensor element 141 which the operator may install at wish at any one of a number of positions along the length of the table 23 and in alignment with the bale chamber 4. In the embodiment as shown, three such positions are provided, two of which are located along the length of the base module 20 and one of which is located within the bale-dumping module 301.

The sensor element 141 is fixedly connectable to any one of three pivot shafts 142 dependent on the length of bales 3 to be handled. Two pivot shafts 142 are pivotally mounted on the chassis 21 below the surface 27 of the main table 23 and a third pivot shaft 142 is pivotally mounted on the bale-dumping table 309 below the surface 307 thereof. An arm 143 is connected to each one of these pivot shafts 142 and a linkage mechanism 144 comprising three links 145, 146 and 147 interconnects all three of said arms 143 with a control mechanism 150. A first link 145 interconnects the first and second arms 143 and a further link 146 interconnects the second arm 143 and a further arm 148 of the control mechanism 150. A third link 147 interconnects the third arm 143 and still another arm 149 of the control mechanism 150.

The control mechanism 150 comprises a pivot shaft 151 which is mounted coaxially with the pivot axis 304 of the bale-dumping table 309, the arrangement being such that the main sensor 140 does not interfere with the dumping operation of the bale-dumping table 309 as will be explained furtheron.

The arms 148 and 149 already referred to are fixedly coupled to the pivot shaft 151 which further also supports a cam 152 consisting of generally circular section 153 and a generally radial section 154. A pivot lever 155, which is pivotally mounted on the chassis 21, is provided with a cam roller 156; said roller 156 engaging the cam surface and being positioned in contact with the radial section 154 when the sensor 140 is not activated and in contact with the circular section 153 when the sensor 140 is activated. As a consequence, the pivot lever 155 is movable between the home position shown in full lines in FIG. 8 and the actuated position partially shown in broken lines in the same Figure. When the sensor member 141 is installed on the bale-dumping table 309 the downward pivotal movement of said table 309 during the dumping operation causes an additional angular displacement of the cam 152 on top of the angular displacement induced thereto by the actuation of the main sensor member 141 by a bale 3. However, such additional angular displacement of the cam 152 has no effect whatsoever on the controls in as much as it only results in the cam roller 156 being positioned further along the arcuate cam surface 153, i.e. the pivot lever 155 remains in its broken line position of FIG. 8 when the dumping table 309 is pivoted downwardly while the sensor member 141 positioned on said table 309 is depressed. This thus also means that, as already mentioned, the dumping cycle does not interfere with the operation of the main sensor 140.

The free end of the pivot lever 155 is coupled via a link 185 to one arm 187 of a further control member 186 pivotally mounted at 188 on the chassis 21 and also comprising a second and a third arm 189 and 190 respectively. A damping cylinder 191 (FIG. 14) is coupled to the third arm 190 and the second arm 189 is provided with actuator surfaces 192 and 193 which engage a roller 431 of a control indicated generally at 430 in FIGS. 15 and 16. The roller 431 engages the actuator surface 192 when in the home position.

With reference to FIGS. 14 to 19, the centralized controls will now be described in more details. The control 430 already mentioned hereabove forms part thereof. These centralized controls basically are mounted on three stationary shafts 450, 451 and 452 which extend between plate members 453 which are attachable to the supports 24 of the chassis 21. These centralized controls thus, in effect, form a module 449 which can be pre-assembled and mounted as such on the accumulator 1.

Considering now more specifically FIGS. 14 to 16 the control 430 will now be described in more details. As already indicated, this control comprises a roller 431 which is rotatably mounted on an arm 432 which itself is coupled to a bushing 433 which is freely rotatably mounted on the shaft 450. It will be understood from an inspection of FIGS. 14 and 15 that the control member 186 and the arm 432 are movable in different planes and that, as a consequence, the actuator surfaces 192 and 193 are displaced axially relative to the roller 431 during operation, this being the reason for the relatively large axial length of the roller 431.

It further also should be remarked that, when the main sensor 140 is depressed by a bale 3 arriving on the table 23 and thus the control lever 155 is pivoted clockwise as seen in FIG. 8, the roller 431 rides along the actuator surface 192 until it flips off the end thereof and thus permits the arm 189 to move to the other side (i.e. above ) the roller 431. This is necessary to avoid an eventual interference with the subsequent resetting of the controls as will be described furtheron. As soon as the arm 189 of the control member 186 has passed to the other side of the roller 431, the arm 432 is permitted to fall back to its original full line position of FIG. 15 against a stop 434. However, before this happens, the arm 432 has reached its broken line position of the same Figure and in which it has already triggered the one or the other overcenter device 130 or 230 as will be described hereinafter.

To enable the control member 186 to return to its home position, an extra pivot 435 is provided between two portions 436 and 437 of the arm 432. The axis of this pivot 435 is positioned at an angle relative to the path of the arm 189 of the control member 186 and a stop or abutment 438 is operatively associated with the portions 436 and 437 so that, when the member 186 moves away from its home position, the stop 438 is operative to hold the portions 436 and 437 in alignment to each other. In other words, the arrangement is so that the portion 436 is urged in the clockwise direction as seen in FIG. 16 by the action of the actuator surface 192 of the member 186 when the latter is moved away from the home position. Thereby the stop 438 becomes operative so that the portions 436 and 437 indeed are held in alignment and in effect actually form a rigid arm 432 whereby this arm 432 is caused to pivot around the axis of the shaft 450 by the aforementioned movement of the control member 186. However, once the arm 189 of the member 186 has passed behind the arm 432 (i.e. above the arm 432 as seen in FIG. 15) and subsequently is caused to return to its home position (by spring means, not shown, acting on the main sensor 140) when the sensor member 141 is no longer depressed by a bale 3, said arm 189 will engage the roller 431 from the opposite direction and with its inclined actuator surface 193 which is oriented at an angle relative to the actuator surface 192. This return movement of the control member 186 now exerts a force in the opposite direction on the arm portion 436 and causes said arm portion 436 to pivot around pivot 435 in the anti-clockwise direction as shown in broken lines in FIG. 16. Thereby the control member 186 is permitted to return to its home position below the arm 432 which itself previously also has already dropped to its home position. The control member 186 is permitted to return to its home position when the sensor means 140 is released after a bale 3 has been shifted sideways away from the sensor member 141. Spring means (not shown) extending between the arm portions 436 and 437 tend to hold these portions in alignment with respect to each other.

A curved actuator member 440 is adjustably connected to the arm 437 and, dependent on its relative position, is engageable with either the first or the second over-center device 130 respectively 230. Such engagement takes place when the arm 432 is caused to pivot to the position shown in broken lines in FIG. 15. Actuation of these over-center devices 130, 230 results, as already indicated, in a shifting of the corresponding hydraulic valves 102, respectively 202.

The over-center devices 130 and 230 comprise first members 131, 231 which are pivotally mounted via bushings 132, 232 on the first shaft 450 and second members 133, 233 which are pivotally mounted via bushings 134, 234 on the third shaft 452. The second members 133, 233 comprise rods 135, 235 which are slidably received in apertured pivots 136, 236 associated with the arms 137, 237 of the first members 131, 231. Springs 138, 238 extend around the rods 135 and 235 and between the bushings 134, 234 and the pivots 136, 236. These springs 138, 238 tend to hold the overcenter devices 130, 230 in any one of their opposite extreme positions while permitting a tripping of these devices when actuated by any actuator means. The curved actuator member 440 is one such actuator means which is disposed to engage either pair of the arms 137 or 237. The bushings 132 and 232 are coupled via arms 139 respectively 239 to the valves 102 respectively 202.

The reset mechanism 160 associated with the bale-turning mechanism 110 comprises a rod 162 which is pivotally coupled at one end to the arm 161 secured to the main pivot shaft 111 of the bale-turning mechanism 110 as already described, and which is slidably received through an apertured bracket 163 secured to the bushing 132 of the first over-center device 130; said rod 162 being provided with a stop 164 at its free end for abutting with the bracket 163. This rod 162 and the associated bracket 163 effectively form a first end-of-stroke sensor 160 which becomes operative to switch the over-center device 130 back over center when the bale-turning means 110 reaches its fully extended position and whereby, as already explained, the valve 102 is returned to its initial position and the bale-turning mechanism 110 is returned to its home position. As said bale-turning mechanism 110 reaches its home position, a second end-of-stroke sensor 240, still to be described, triggers the operation of the bale-transfer means 210.

Figure 14:
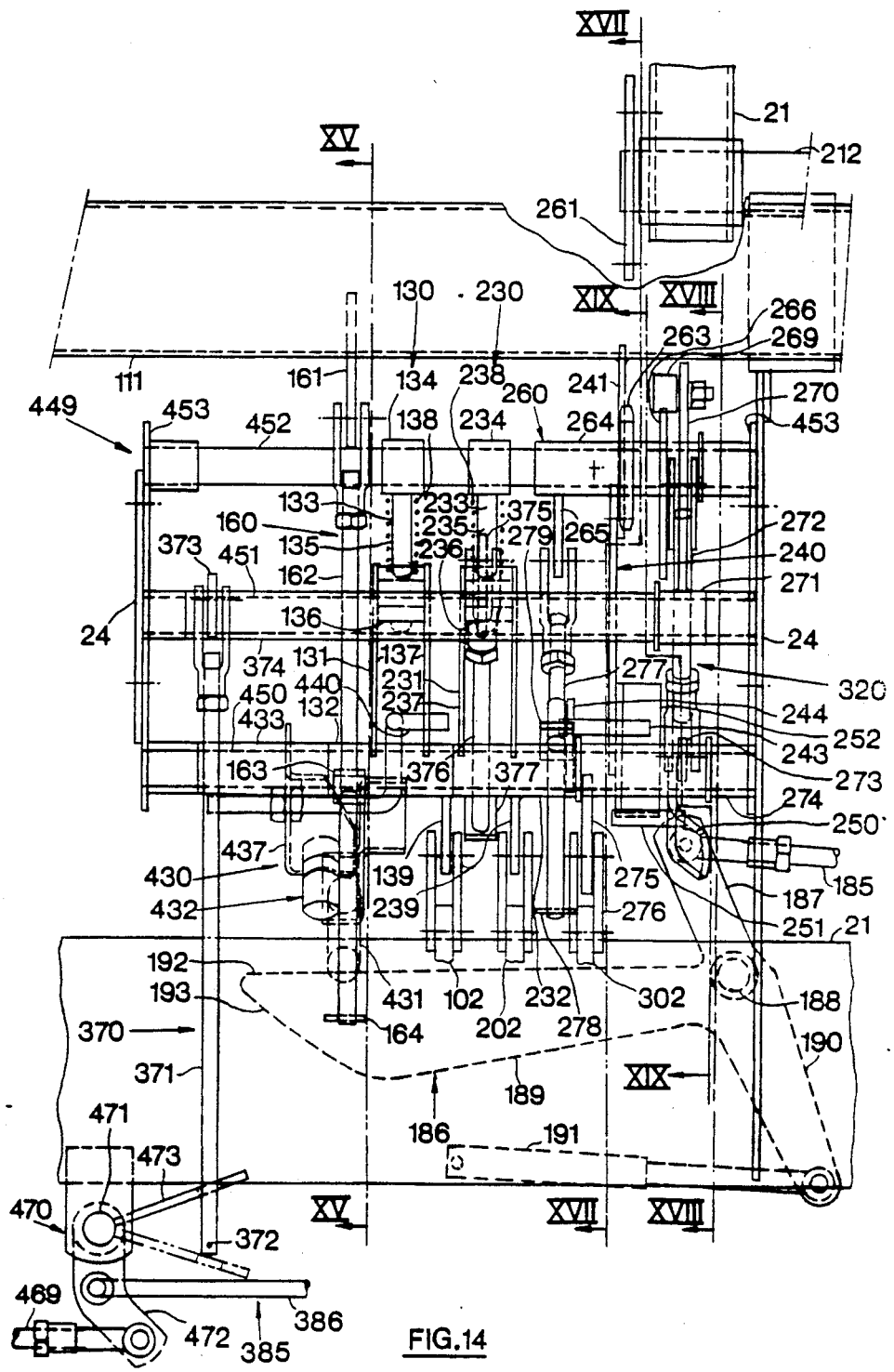
FIG. 14 is a side view of the centralized mechanical control module 449 of the accumulator according to the present invention.

By the way, it will be noted that the bushings 433, 132 and 232 extend alongside each other and on the shaft 450; the bracket 163 being connected to the bushing 132 rather than to the bushing 433 (as eventually could be derived from FIG. 15 if not carefully analysed in view of the teaching of FIG. 14).

Thus, the controls described so far are operable to detect the presence of a bale 3 on the left-hand side of the table 23 (i.e. a bale 3 which has emerged from the bale case 4) and to trigger, in response thereto, the bale-turning cycle. This causes a turning through 90° of the bale 3 whereby said bale is placed with its shorter edge on the table 23 but still substantially in alignment with the bale chamber 4. After the bale-turning means 110 has turned a bale 3 as described, it automatically returns to its home position by virtue of the resetting of the first over-center mechanism 130. In case the actuator member 440 is positioned to actuate the second over-center device 230 then the bale-turning cycle is skipped and actuation of the main sensor 140 immediately triggers the bale-transfer cycle.

Figure 19:
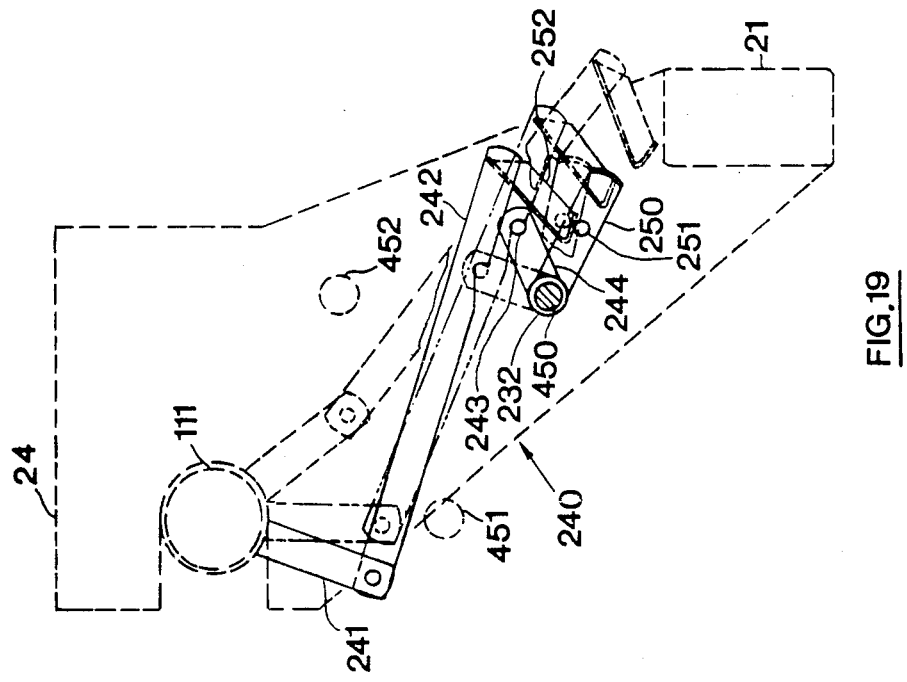

Turning now to FIGS. 14 and 19 the triggering of the bale-transfer cycle will now be described. When the bale-turning means 110 returns to the home position, arm 241 on the pivot shaft 111 of the bale-turning means 110 causes a hook 242 to slide along a pin 243 and eventually to engage said pin 243 shortly before the bale-turning means 110 reaches the home position. This pin 243 is attached to a lever 244 which itself is secured to the bushing 232 of the second overcenter device 230 and the arrangement is such that, as the bale-turning mechanism 110 reaches the home position, the hook 242 causes via the pin 243 and the lever 244 the second over-center device 230 to flip over center. This, in turn initiates, as already explained, the bale-transfer cycle of the bale-transfer means 210.

During the bale-transfer cycle the pivot shaft 212 of the bale-transfer means 210 is pivoted back-and-forth through a relatively small angular displacement. This angular displacement is amplified via special means which will be described hereinafter and which a.o. operates the reset mechanism 260 which effectively forms a third end-of-stroke sensor. These special means comprise a pair of arms in the form of the plate member 261 secured to the pivot shaft 212. A chain 262 is coupled to the free ends of these arms 261 and drivingly extends around a sprocket 263 secured on a bushing 264 which itself is freely rotatably mounted on the shaft 452. The bushing 264 has fixedly connected thereto an arm 265 of the reset mechanism 260 and a cam 266 of semi-circular shape.

Figure 18:
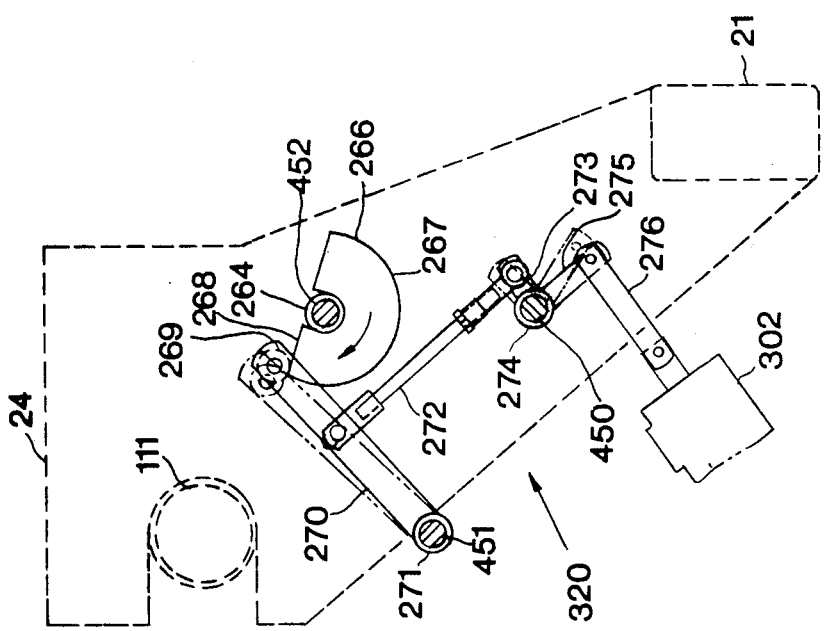

Considering now first the cam 266, it will be seen from FIG. 18 that it comprises a generally circular cam surface 267 and a generally radial cam surface 268, both of which can cooperate with a cam roller 269 provided on a pivot arm 270 secured to a bushing 271 which is pivotally mounted on the shaft 451. Spring means (not shown) urge the pivot arm 270 towards the cam 266. The cam 266 is positioned so that the cam roller 269 contacts the radial surface 268 when the bale-transfer means 210 is in the home position and contacts the circular surface 267 soon after the bale-transfer means 210 is moved away from its home position. The cam roller 269 remains in contact with this circular surface 267 during most of the bale-tranfer cycle, i.e. until shortly before the bale-transfer means 210 resumes its home position. This engagement of the cam roller 269 with the circular cam surface 267 shifts, via pivot arm 270, linkage 272, arm 273, bushing 274, arm 275 and link 276 the valve 302 to the B position whereby, as already discribed, during virtually the entire bale-transfer cycle the pressure fluid flow to the motor 303 is positively interrupted. This pressure fluid flow is resumed only when the bale-transfer means 210 returns to the home position. The mechanism as described hereabove thus, in effect, constitutes the linkage 320 to which reference has already been made and which effectively forms a fourth end-of-stroke sensor.

The bushing 274 also has a further arm 250 (FIGS. 14 and 19) attached thereto and which carries a pin 251. This pin 251 is disposed to engage an extension 252 on the hook 242 and to thereby lift said hook 242 when the cam roller 269 engages the circular cam surface 267 i.e. when the bale-transfer means 210 has moved away from the home position. This effectively results in the hook 242 being lifted away from the pin 243 soon after the bale-transfer means 210 has started its operation. As a consequence arm 244 with the pin 243 thereon and thus also the second over-center device 230 are set free already for subsequently being reset in the home position. This avoids any interference between the various control components during the subsequent resetting of the second over-center device 230 when the bale-transfer means 210 reaches its fully extended position. Again one should be careful when analysing FIG. 19. It indeed should be kept in mind that the lever 244 and the arm 250 are not fixedly coupled to each other in as much as these components are coupled to the bushings 232 and 274 respectively which both are freely rotatably mounted on the shaft 450; only bushing 232 being shown in FIG. 19.

Considering now the third end-of-stroke sensor or resetting mechanism 260 for the second over-center device 210 in more details, this comprises a rod 277 which is pivotally attached at one end to the arm 265 on the bushing 264 of which the position is controlled by the sprocket 263 already described. The rod 277 has a stop 278 which, towards the end of the operative stroke of the bale-transfer means 210, cooperates with an apertured bracket 279 secured to the bushing 232 of the second over-center device 230 to flip this device back to its initial position and to thereby cause the bale-transfer means 210 to return to the home position.

Having described now in all details the various controls associated with the bale-transfer means 210, it will be appreciated that, when a bale 3 has been turned on its edge at the left-hand side of the table 23 and the bale-turning means 110 has returned to the home position, the bale-transfer means 210 is actuated, via a tripping of the second over-center device 230, to shift this bale 3 transversely to the right. The stroke of the bale-transfer means 210 is such that this bale 3 is transferred over substantially the width of one bale thus clearing the path for the next bale 3 which starts emerging from the bale chamber 4. The bale 3 thus transferred sideways is positively held between all three bale-stabilizing means 60, 65 and 70. The third end-of-stroke sensor formed by the reset mechanism 260 resets the controls to the original position upon the bale-transfer means 210 reaching the maximum extension thus triggering the return stroke of this means 210. Upon the bale-transfer means 210 reaching the home position, the accumulator 1 is ready for receiving a next bale 3.

The bale-turning and bale-transfer cycles as described above are repeated two more times with each time a further bale 3 being added to the bale 3 or bales 3 already accumulated on the load bed 19. As a second and third bale 3 are added to form a parcel, the third bale-stabilizing means 70 is urged over a corresponding distance to the right while still exerting a sufficient pressure on the bales 3 for, in cooperation with the first and second bale-stabilizing means 60, 65 to keep them tightly together in a neat parcel.

When a fourth bale 3 has been received on the table 23 and after this fourth bale 3 equally has been turned on its edge, the bale-transfer cycle is initiated a fourth time. However, this fourth cycle is interrupted earlier than all previous bale-transfer cycles by virtue of the arrangements which will be described hereinafter in more details. It also will be appreciated that, if the control member 440 of the main sensor means 140 is set to trigger the second over-center device 230, the bale-turning cycle will be skipped completely and only the bale-transfer cycles will be carried out.

Considering now in more details the bale-discharge cycle, a full load sensor 360 is provided generally at the right-hand side of the accumulator 1, i.e. at the right-hand side of the extension module 50. This full load sensor 360 comprises a sensor member 361 (FIG. 5) which is positioned above the level of the load bed 19 and which is affixed to a vertical pivot shaft 362 which is provided at a level below the load surface 57 with an arm 363 to which is coupled a linkage 364 which extends underneath the load bed 19 to the left of the machine where the centralized controls module 449 is located.

The linkage 364 comprises a first rod 365 which is coupled via a universal joint 366 to a further rod 367; the universal joint 366 being aligned with the pivots 51 of the extension module 50 to the base module 20. The further rod 367 is coupled to a bell-crank lever 460 comprising a pivot shaft 461 and a pair of arms 462, 463; one arm 462 being coupled to said further rod 367 and the other arm 463 being coupled to a third rod 464. The bell-crank lever 460 further also comprises a third arm 465 attached thereto and which forms part of the locking mechanism 401 to be described hereinafter in more details.

The third rod 464 is pivotally coupled at its other end to a first arm 467 of a further bell-crank lever 466, the second arm 468 of which is coupled to a fourth rod 469 which, in turn, is coupled to a fourth bell-crank lever 470 (FIGS. 5 and 14) comprising a pivot 471 and arms 472 and 473; this fourth bell-crank lever 470 controlling both the clutch 330 and a second reset mechanism 370 for the bale-transfer means 210.

Considering first the clutch control 385, this comprises a rod 386 which is coupled at one end to the triggering mechanism 395 of the clutch 330 and at the other end to the arm 472 of the bell-crank lever 470.

Considering next the second reset mechanism 370, this comprises a rod 371 provided with a stop 372 at one end and which is slidably received through an apertured bracket which is formed by the arm 473 of the bell-crank lever 470. The rod 371 is coupled at its other end to an arm 373 secured to the bushing 374 to which also a further arm 375 is attached and which itself, in turn, is coupled to still a further rod 376 which is slidably received through an apertured bracket 377 secured to the bushing 232 of the second over-center device 230; the rod 376 being provided with a stop 378 which can cooperate with the bracket 377.

The arrangement of the various controls described hereabove is such that, after a fourth bale 3 has arrived on the table 23 and has been turned by the bale-turning means 110, the operation of the bale-transfer means 210 is initiated in the manner as described before. The fourth bale 3 together with the three bales 3 previously accumulated on the load bed 19 are shifted over an initial distance across the load bed 19 and to the right thereof until the first bale 3 on the load surface 57 actuates the full load sensor 360. However, this initial displacement is already sufficient for the cam roller 269 of the hydraulic motor control 320 to become positioned on the circular cam surface 267 of the cam 266. As a consequence, the pin 243 is already set free from the hook 242 in the bale-transfer control 240 so that the second over-center device 230 is made ready for resetting.

Now, upon the initial displacement of all four bales 3 accumulated on the load bed 19, the full load sensor 360 is actuated. This first results in the releasing of the clutching lever 335 of the clutch 330 so that this clutch 330 is set ready for transferring motive power. However, at this point in the cycle, no pressure fluid is supplied to the motor 303 by virtue of the motor control 320 being operated to hold the valve 302 in the B position. As a consequence the bale-discharge means 310 still is not yet operated.

Upon continued actuation of the full load sensor 360, the second over-center device 230 subsequently is flipped back to its initial position via the resetting mechanism 370. As a consequence, the bale-transfer cycle is interrupted before reaching its maximum extension and the bale-transfer means 210 is returned to the home position. Upon the bale-transfer means 210 reaching the home position, the valve 302 is returned to the A position and the hydraulic motor 303 is powered whereby the bale-discharge cycle effectively is initiated in as much as the bale-discharge conveyor 310 starts pushing the parcel of bales 3 in the rearward direction.

As the parcel of bales 3 is transferred in a rearward direction, it is urged inbetween the bale guide means 31, 32 which cooperate with the bale-stabilizing means 60, 65 and 70 to firmly hold the bales 3 together in a neatly formed parcel. As the center of gravity of the parcel is transferred from a position above the load bed 19 to a position above the bale-dumping table 309, the holding means 350 for the latter all of a sudden give way whereby the bale-dumping table 309 abruptly flips downwardly and, as a consequence, the parcel of bales 3 is dumped as a single unit onto the ground. The bale guide means 31, 32 continue to act on the bales 3 to hold them together during the actual dumping thereof. When operating on hillsides, the bale guide means 31, 32 further also are effective to prevent bales 3 from tipping sideways during the bale dumping cycle. As the parcel of bales 3 drops from the bale-dumping table 309, the reset spring 356 of the suspension means 350 causes the bale-dumping table 309 to return to its home position in which the latch 340 is snapped in again.

The bale-discharge conveyor 310 continues to be driven, even if the parcel of bales 3 has already dropped to the ground, until it reaches a position ready for the next dumping cycle. It should be repeated in this respect that, as the full load sensor 360 is operated, an initial displacement thereof results in the actuation of the clutch 330 and a further displacement thereof subsequently results in the resetting of the bale-transfer controls i.e. the second over-center device 230. When the parcel of bales 3 is being discharged, the full load sensor 360 is permitted to return to its home position. However, this should not result in a premature disengagement of the clutch 330. To accomplish this, a locking mechanism 401 is provided to which reference has already been made and which now will be described in more details.

This locking mechanism 401 is associated with the arm 465 secured to the bell-crank lever 460 which itself is part of the full load sensor linkage 364. The locking mechanism 401 comprises a hook 402 attached to a pivot 403 and to which further also is attached an arm 404. Spring means (not shown) urge the locking mechanism 401 in a direction so that the hook 402 extends in the path of the arm 465 of the bell-crank lever 460 and the arm 404 extends in the path of one of the conveyor members 316 of the bale-discharge conveyor 310. The hook 402 comprises a lead-in surface 405 whereby said hook 402 is urged to retract away from the path of the arm 465 of the bell-crank lever 460 when said arm 465 is moved away from the home position and past the hook 402. This permits the arm 465 to snap behind said hook 402 whereby the locking mechanism 401 becomes operative. This occurs when the full load sensor 360 is operated. However, when the full load sensor 360 is released upon the dumping of the parcel of bales 3, the hook 402 prevents the arm 465 from fully returning to its home position and thus also prevents a premature disengagement of the clutch 330. As a consequence, the bale-discharge conveyor 310 continues to be driven. This condition is maintained until one of the conveyor members 316 engages the arm 404 whereby the hook 402 is retracted and the full load sensor 360 thus is permitted to fully return to its home position. This then results in the clutch 330 being disengaged at the moment when the bale-discharge conveyor 310 reaches a position ready for initiating the next bale-discharge cycle. The bale-discharge conveyor 310 thus is stopped in this position even though the hydraulic motor 303 continues to be driven until the next bale-transfer cycle is initiated. In summary, the combination of the hook 402 and the arms 404 and 465 thus form the latch 401 and the reset mechanism 410 already referred to.

It finally also will be appreciated that the bale-discharge cycle is totally independent from whether or not the bale-turning cycle has been skipped, i.e. bales accumulated "flat" on the load bed 19 equally will be discharged in a neat parcel onto the ground. However, such a parcel will comprise only three bales 3 in as much as the full load sensor 360 will be operated already upon the sideways transfer of the third bale 3.

It will be understood that changes in the details, materials, steps and arrangements of parts, which have been described and illustrated to explain the nature of the invention, will occur to and may be made by those skilled in the art upon a reading of this disclosure within the principles and scope of the invention.

Figure 20:
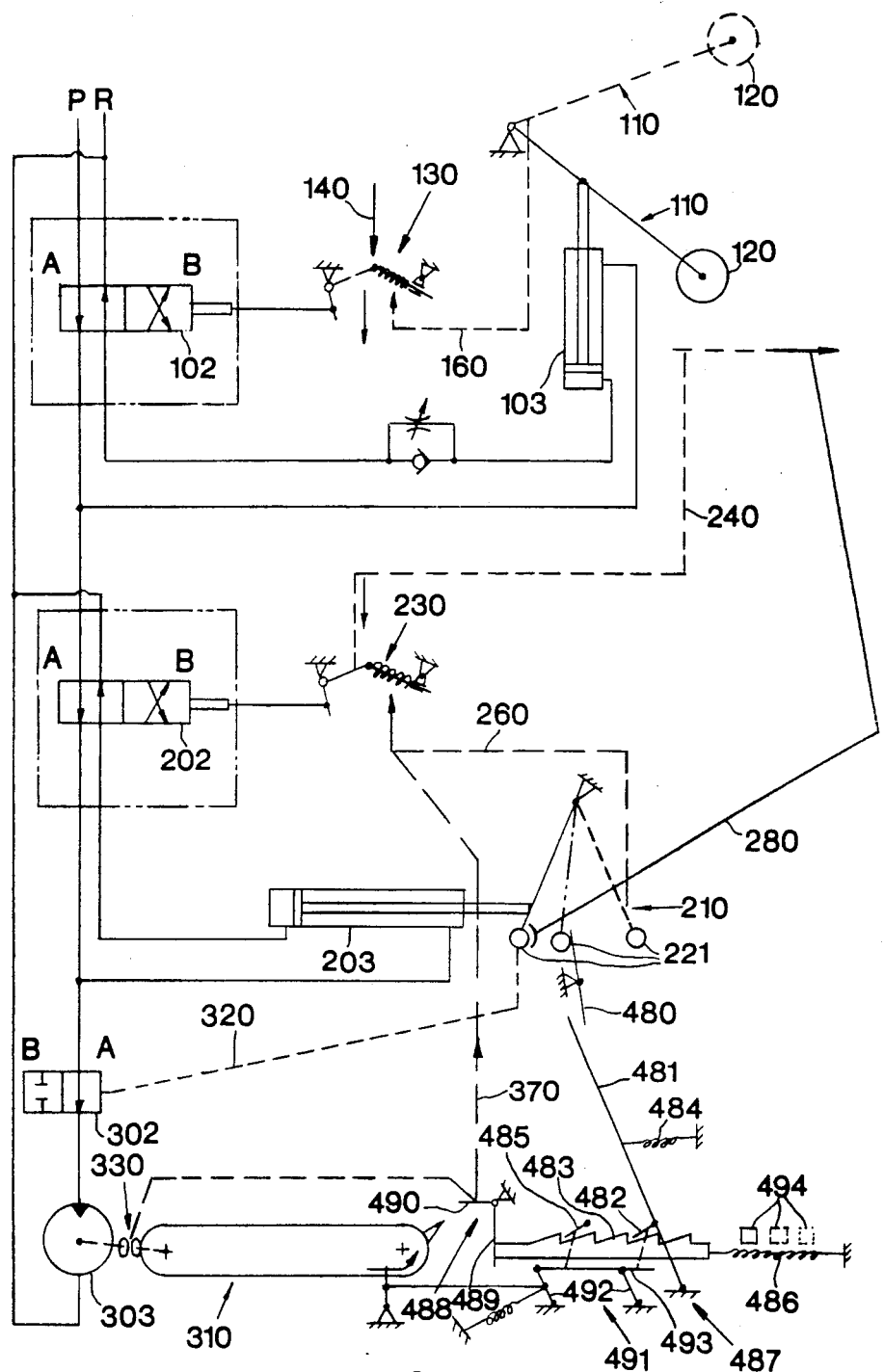
FIG. 20 is a schematic diagram similar to FIG. 6 but illustrating an alternative embodiment of the invention.

With reference to FIG. 20 one such alternative arrangement will now be described. It will be noted that, while the controls for the bale-turning means 110 and the bale-transfer means 210 in this arrangement are identical to the corresponding controls described with reference to FIG. 6, the controls associated with the bale-discharge means 310 are basically different. Returning to the bale-transfer means 210 of the arrangement according to FIG. 20 it will be noted that, once it has moved to some extent from the home position, but before it reaches its fully extended position, it engages a pivoted link or actuator 480 which in turn actuates a pivoted rod 481 to which is attached a pawl 482 which, when the rod 481 is pivoted, moves a ratchet bar 483 to the left (as shown in FIG. 20), thus effecting a count of one bale 3. When the rod 481 is free to return to its original position, it does so under the action of a spring 484, a holding pawl 485 serving to retain the ratchet bar 483 in position during this return movement. Without the action of this holding pawl 485, the ratchet bar 483 would be returned to its initial position by a spring 486.

Assuming that the accumulator 1 is set to accomodate four bales 3, the ratchet bar 483 is moved along by one notch for each of the first three bales 3 and each time the bale-transfer means 210 returns to the home position the motor 303 has no effect on the unloading conveyor 310 because the clutch 330 is still disengaged. However, when the fourth bale 3 has been turned through 90°, it is essentially in its final position in as much as there is no room for it to be shifted sideways by one bale width. There is in fact a small gap between that final bale 3 and the third bale 3 which need to be taken up to ensure that the parcel of four bales 3 is dicharged in a compact manner. To this end, the bale-transfer means 210 is actuated as previously but as soon as it reaches the position in which the actuator 480 is operated and the counting mechanism 487 actuated through the rod 481, the ratchet bar 483 immediately engages one arm 489 of a bell-crank lever 488, the other arm 490 of which pivots and effects two operations. The first operation is to reset the valve 202 from the B to the A position through the linkage 370 as already explained in connection with the preferred embodiment shown in FIG. 6 and whereupon the actuator 203 is reversed so that the bale-transfer means 210 has only executed a small part of its normal operating cycle, this being sufficient just to close the fourth bale 3 to the third bale 3 before being returned to the retracted or home position. The second action of the bell-crank lever arm 488 is to engage via the linkage 385 the clutch 330. Thus, when the bale-tranfer means 210 has this time returned to the home position, the re-energisation of the motor 303 through the valve 302 can actually drive the unloading conveyor 310 to push the parcel of four bales 3 from the accumulator load bed 19 to the ground. As the conveyor 310 continues moving, it eventually engages beneath the load bed 19 a trip mechanism 491 which has two parallel and pivoted arms 492 attached to a bar 493 which in turn is connected to both of the pawls 482 and 485. When the arms 492 are pivoted, the bar 493 is raised and hence the pawls 482 and 485 are raised clear of the ratchet bar 483 which is thus returned to its original position by the action of the spring 486. An adjustable stop mechanism 494 for the ratchet bar 483 is provided so that it returns to the required initial position which is adjusted by the operator according to whether two, three or four bales 3 are to be accumulated in a parcel. It thus will be appreciated that the counting mechanism 487 effectively is the equivalent of the full load sensor 360 of the preferred embodiment described hereabove with reference to the FIGS. 1 to 19.

Figure 21:
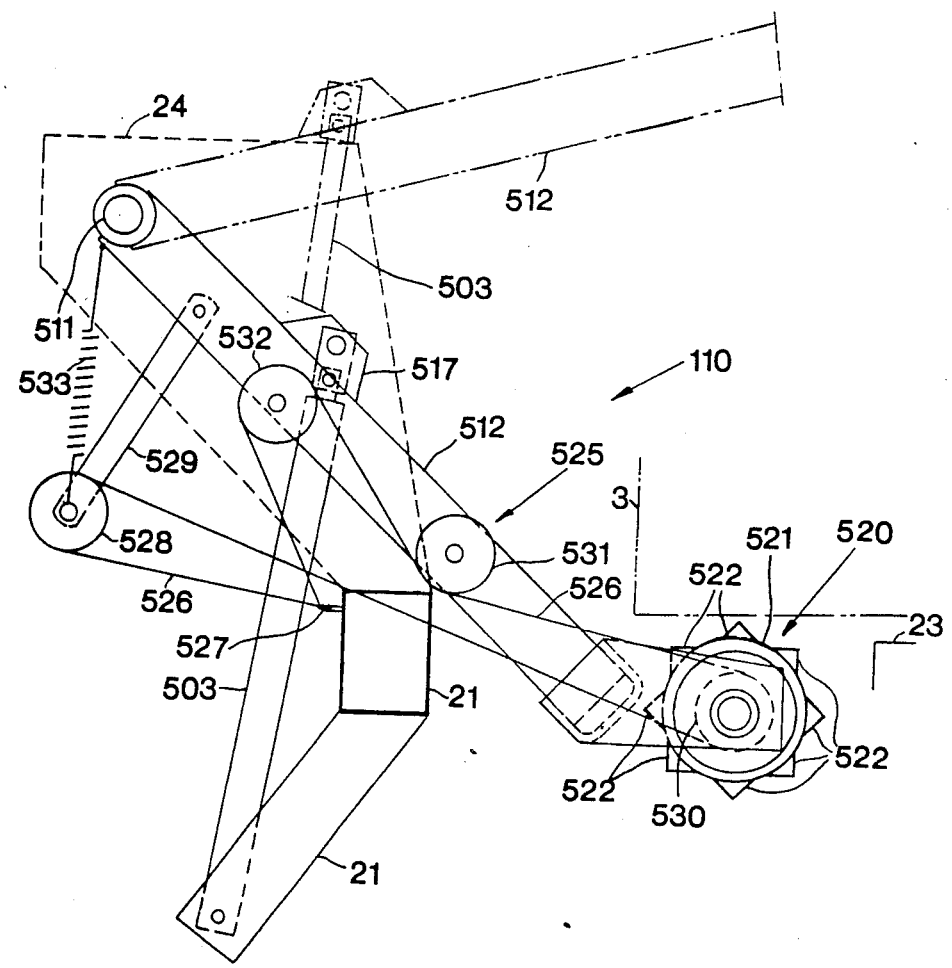
FIG. 21 shows an alternative embodiment of the bale-turning means 110 according to the invention.

With reference to FIG. 21 an alternative embodiment of the bale-turning means 110 will now be discribed. This bale-turning means 110 again comprises a main pivot shaft 511 which is pivotally mounted on the supports 24. A pair of arms 512 are fixedly connected at one end to the pivot shaft 511 and are interconnected at their free ends (which are cranked) by a roller 520 comprising a plurality of discs 521 which support around the periphery of the roller 520 a number of inverted angle iron members 522. The roller 520 is rotatably mounted on the arms 512. The actuator 503 is connected between the accumulator chassis 21 and one of the arms 512 by way of an extension or tab 517.

The alternative bale-turning means 110 further also comprises a drive mechanism 525 for the roller 520 so that the latter is driven when it is raised from the full line, home position of FIG. 21 to the fully extended, broken line position of the same Figure. This drive mechanism 525 comprises a cable 526 which is attached at one end 527 to the accumulator chassis 21 and then extends around a pulley 532 and a further pulley 531 which both are rotatably mounted on the adjacent arm 512. The cable 526 then extends from the pulley 531 to a pulley 530 provided at the adjacent end of the roller 520; the cable 526 being given multiturns on this pulley 530. The cable 526 then extends to a further pulley 528 rotatably mounted on one end of an arm 529 which is pivotally mounted at the other end on the adjacent arm 512. Finally, the cable 526 is reattached to the accumulator chassis 21 at 527.

When this bale-turning mechanism 110 is rendered operative in the manner already described, the actuator 503 is extended and the two arms 512 thus rotated, carrying with them the roller 520 which thus is brought into engagement with the bottom of a bale 3 which is now alongside the bale-turning mechanism 110 and the bale-transfer mechanism 210. The roller 520 engages the bale 3 at or towards one longitudinal edge thereof which overlaps the adjacent edge of the table 23. As the arms 512 are rotated, the cable 526 starts to drive the roller 520 and the members 522 thereof bite into the bale 3 and thus move this bale 3 relative to the roller 520 and hence pull it towards the roller 520 on the edge about which it is being tipped to effect turning thereof substantially within its own width. It will be seen that the basic movement of the roller 520 is that of a lifting movement as far as the bale 3 is concerned, but this lifting movement is augmented by the turning movement effected by the rotating roller 520 which is benifical in order to effect turning within the width of the bale 3. Otherwise, the bale 3 might merely be tilted about the lower corner remote from the bale-turning means 110 and might require a wider table 23. As the roller 520 moves upwardly, an increase in length of the cable 526 normally would be required because the distances between the cable fixation point 527 and the pulleys 530, 531 and 532 increase. This problem is overcome by means of the pulley 528 rotating anti-clockwise on the arm 529 when the arms 512 are pivoted upwardly. When the roller 520 returns to the home position, the pulley 528 is also returned to its initial position by the action of a spring 533 connected between the arm 529 and the associated arm 512.

Whilst it is beneficial to drive the roller 520 in order to effect positive turning of the bale 3, the roller 520 also could be made merely freely rotatable.

As already explained, all of the bales 3 in a given parcel are shifted sideways (irrespective of whether they have been turned through 90°) so as to be positioned closely adjacent each other. It is important to maintain this position during discharge of the parcel from the load bed 19 so as to keep the neat parcel for subsequent handling by mechanised means. Furthermore, keeping the bales 3 of a parcel close to each other during discharge provides inter-bale friction such that it is unlikely that one bale 3 will fall before another and thus destroy the parcel.

Figure 22:
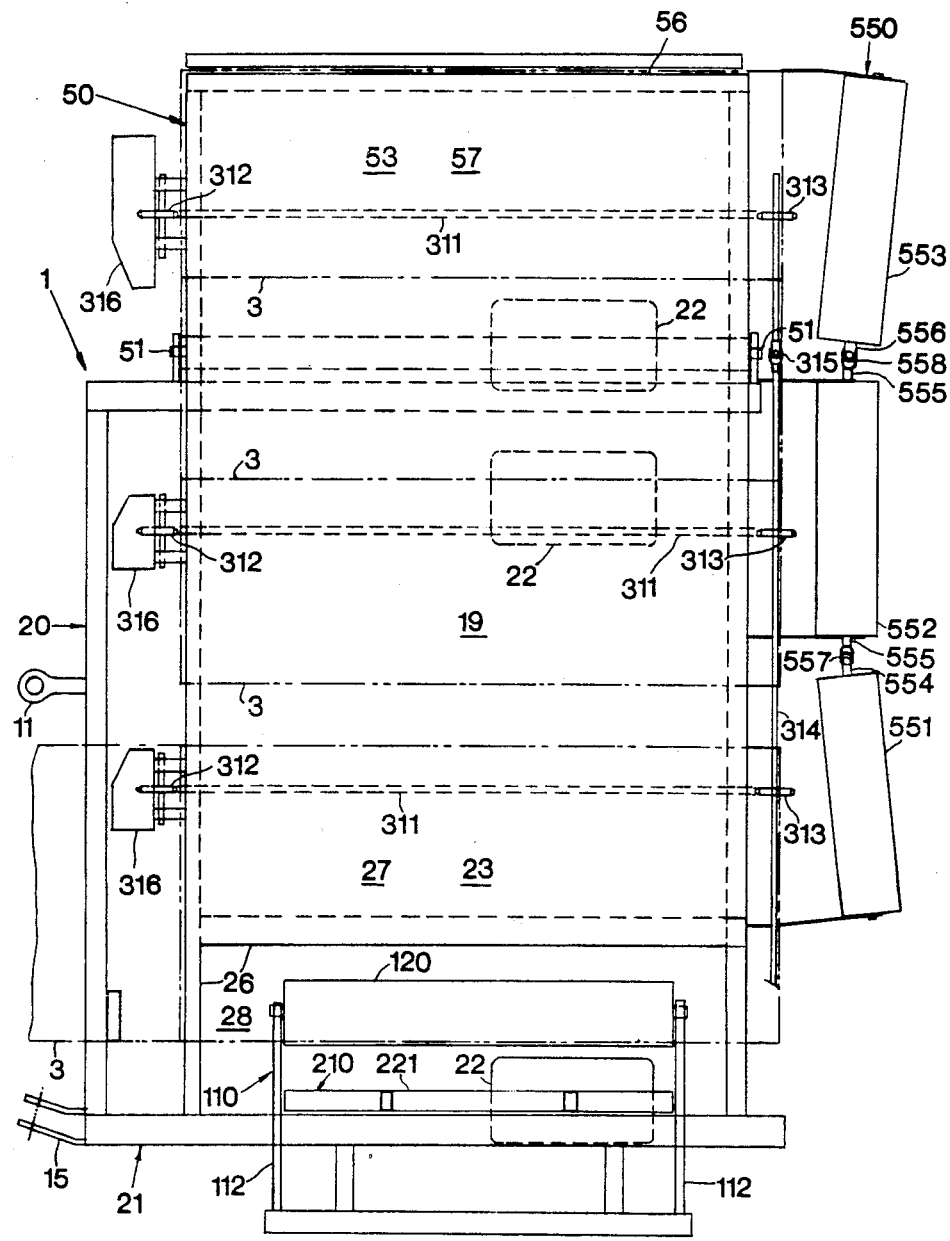
FIG. 22 is a view similar to FIG. 5 but illustrating a different embodiment of the bale-dumping means according to the invention.

With this objective in mind, an alternative bale-converging mechanism 550 may be provided as is illustrated in FIG. 22. This mechanism is in the form of two rollers 551, 552 as regards the basic module 20, with an additional roller 553 forming part of the extension module 50. These rollers 551, 552, 553 take the place of the bale-dumping module 301 already described herebefore.

The roller 552 is mounted generally parallel to the discharge edge of the table 23 with the rollers 551 and 553 having their rotational axes inclined thereto, in a generally horizontal plane, by an angle of the order of 175°. The rollers 551, 552 and 553 are freely rotatable in the illustrated embodiment but may be driven if required. Each roller 551, 552, 553 is formed from pieces of angle iron secured to discs at either end and the rollers are mounted on respective portions 554, 555 and 556 of a common shaft, which portions are interconnected by universal joints 557 and 558 so as to accomodate the relative inclination referred to. In the basic module 20, the two rollers 551 and 552 are interconnected by the universal joint 557 which serves only to accomodate the inclination of the roller 551 with respect to the roller 552. However, in the full size accumulator 1, the universal joint 558 which connects the central roller 552 to the additional roller 553 is arranged not only to accomodate the relative inclination but also to allow the extension module 50, of which the additional roller 553 forms part, to be turned through 90° or some other angle for transportation purpose, i.e. to reduce the overall width of the accumulator 1 as already mentioned.

The inclined or converging arrangement of the rollers 551, 552 and 553 in the direction of bale discharge together with the rotational coupling therebetween ensures that the bales 3 of a parcel being discharged are converged or pushed together as they leave the bale accumulator load bed 19. This action may be augmented by additionally providing the stationary bale guide means 31, 32 already referred to.

Furthermore, and as already said hereabove, keeping the bales 3 of a parcel close to each other during discharge provides inter-bale friction which, together with the synchronised rotation of all three rollers 551, 552 and 553 prevents that one bale would fall before another and thus destroy the parcel when discharging a parcel of bales 3 to the ground.

It will also be appreciated that, while bale accumulators as described hereabove are particularly suited for accumulating bales having a rectangular cross section (e.g. 60 cm×90 cm), these accumulators also advantageously may be used for accumulating bales with a square cross section (e.g. 90 cm×90 cm). However, in the latter case, it may be found that the bale-turning cycle has no real merit anymore and thus, the bale-turning cycle preferably should be skipped.

What is claimed is:

1. An agricultural bale accumulator comprising:
   a substantially planar load bed for accumulating thereon a plurality of bales with said bales being received successively one after another in a first direction on said load bed;
   bale-turning means for turning each bale through substantially 90 degrees around its longitudinal axis upon receipt on the load bed, wherein each bale remains on said load bed but is reoriented 90 degrees from its initial position;
   bale-transfer means operable to displace said bales after receipt and reorientation on the load bed, across said load bed in a second direction transverse to the first direction and to position said bales in a side-by-side relationship on said load bed thus forming a parcel thereof; and
   bale-discharge means operable to discharge said parcel of bales accumulated on the load bed to the ground.

2. An accumulator according to claim 1, wherein the bale-turning means comprises means for elevating one side of each bale received on the load bed and has associated therewith means operable to tip said each bale as its one side is being elevated whereby said each bale is turned through substantially 90°.

3. An accumulator according to claim 2, wherein:
   said load bed is attachable to an agricultural baler with one side of the load bed generally in alignment with a bale chamber thereof for successively receiving therefrom bales one after another in said first direction at said one side of the load bed; and
   said bale-transfer means is operable, upon receipt of a bale on the load bed, to displace said bale, together with other bales previously received and accumulated on said load bed, in said second direction across the load bed and towards the other side thereof.

4. An accumulator according to claim 3, wherein the load bed has a width which generally corresponds to the width of said parcel of bales.

5. An accumulator according to claim 4, wherein the bale-transfer means comprises:
- a first pair of arms mounted generally at one end thereof for pivotal movement around a generally fore-and-aft extending pivot axis and interconnected at the other end by a first bale-engaging member; and
- first hydraulic actuator means operatively associated with at least one arm of the first pair of arms for moving the first bale-engaging member back-and-forth between a retracted home position generally adjacent said one side of the load bed and an extended position intermediate the opposite sides of the load bed.

6. An accumulator according to claim 5, wherein each arm of the first pair of arms is mounted via first and second links; said first and second links being pivotally mounted at first spaced apart pivots and at second spaced apart pivots so that, when the first hydraulic actuator means is operated, the first bale-engaging member is moved substantially linearly without sliding relative to a bale being displaced thereby across the load bed.

7. An accumulator according to claim 5, wherein the bale-turning means comprises:
- a second pair of arms mounted generally at one end thereof for pivotal movement around a generally fore-and-aft extending pivot axis and interconnected at the other end by a second bale-engaging member; and
- second hydaulic actuator means operatively associated with at least one arm of the second pair of arms for moving the second bale-engaging member back-and-forth between a retracted home position generally below the load bed and an extended position above the load bed; the relative positions of the second bale-engaging member away from its home position and of a bale as it is received on the load bed being such that, upon receipt of said bale on the load bed and upon movement of the second bale-engaging member away from its home position, said second bale-engaging member engages said bale from below and adjacent one longitudinal side edge thereof.

8. An accumulator according to claim 7, wherein:
- when said load bed is attached to an agricultural baler, the load bed is positioned relative to the bale-chamber of the baler so as to receive bales therefrom at one side of the load bed; and
- when the second bale-engaging member is in the home position, it is positioned closely adjacent said one side of the load bed.

9. An accumulator according to claim 7, wherein the second bale-engaging member comprises bale-penetrating means extending in a fore-and-aft direction from a periphery of the second bale-engaging member and an extension which projects downwardly from said periphery so that, as the second bale-engaging member moves away from the home position towards the fully extended position, the bale penetrating means penetrate the lower side of a bale received on the load bed and subsequently, as the second bale engaging member approaches the extended position, the extension engages said side of the bale so as to thereby turn the bale through 90°.

10. An accumulator according to claim 7, wherein the second bale-engaging member comprises a roller having bale-penetrating means extending from the periphery thereof and which, in use, penetrate a bale received on the load bed as said bale is elevated by the bale-turning means and pull said bale towards the roller on the edge about which it is being tipped, whereby said bale is turned through 90° substantially.

11. An accumulator according to claim 10, wherein the bale-engaging roller of the bale-turning means is freely rotatably mounted on the second pair of arms.

12. An accumulator according to claim 10, wherein the bale-engaging roller of the bale-turning means is driven by drive means.

13. An accumulator according to claim 12, wherein the drive means comprises a cable-and-pulley drive; the roller being provided with a pulley at one end receiving a cable which passes around further pulleys.

14. An accumulator according to claim 7, wherein each arm of the bale-turning means and the bale-transfer means comprises a first portion and a second portion; the second portions each being pivotally coupled at one end to the associated first portion and at the other end to the associated bale-engaging member; and wherein spring means are provided which urge the bale-engaging members towards the extended positions while permitting said bale-engaging members to fold back to the retracted positions when stopped in the path of a bale arriving on the load bed.

15. An accumulator according to claim 1, wherein:
- a first mechanical lock for the bale-transfer means is operatively associated with said bale-transfer means and the bale-turning means; said first mechanical lock being operated by the bale-turning means in a manner to be moved to a retracted unlocking position when the bale-turning means is in a home position and to be moved to an operative locking position when the bale-turning means is moved away from its home position; and
- a further mechanical lock for the bale-turning means is operatively associated with said bale-turning means and the bale-transfer means; said further mechanical lock being operated by the bale-transfer means in a manner to be moved to a retracted unlocking position when the bale-transfer means is in a home position and to be moved to an operative locking position when the bale-transfer means is moved away from its home position.

16. An accumulator according to claim 1, wherein the bale-discharging means comprises:
- fore-and-aft extending endless conveyor chains passing around forward and rearward sprockets on the load bed; each said chain having attached thereto a pair of conveyor members which are spaced apart by equal intervals; and
- drive means including hydraulic motor means and clutch means operatively associated with the conveyor chains for intermittently driving said conveyor chains for discharging parcels of bales accumulated on the load bed.

17. An accumulator according to claim 1 further comprising:
- main sensor means on the load bed generally at a location for detecting the arrival of a bale on the load bed and for, upon said arrival, triggering the bale-turning means and to cause said bale-turning means to move away from a home position;
- first sensor means operatively associated with the bale-turning means for, upon said bale-turning means reaching a fully extended position, causing the bale-turning means to return to its home position;

second sensor means operatively associated with the bale-turning means and the bale-transfer means for, upon the bale-turning means reaching its home position, triggering the bale-transfer means to move away from a home position; and third sensor means operatively associated with the bale-transfer means for, upon said bale-transfer means reaching a fully extended position, causing the bale-transfer means to return to its home position.

18. An accumulator according to claim 17, further comprising:

first and second hydraulic valves operatively coupled to respectively the bale-turning means and the bale-transfer means;

a first over-center device operatively coupled with the bale-turning means and operatively associated with the main sensor means and the first sensor means for, in use, being tripped back-and-forth thereby; and a second over-center device operatively coupled with the bale-transfer means and operatively associated with the second and third sensor means for, in use, being tripped back-and-forth thereby.

19. An accumulator according to claim 18, wherein the main sensor means is adjustable to cooperate with the second over-center device whereby said main sensor means is operable to trigger a bale-transfer cycle and thus skip a bale-turning cycle.

20. An accumulator according to claim 19, further comprising:

fourth sensor means operatively associated with the bale-transfer means and the bale-discharge means for, upon the bale-transfer means reaching its home position, causing energization of a hydraulic motor means of the bale-discharge means; and full load sensor means on the load bed generally at a location for detecting the accumulation of a parcel of bales on the load bed so that when the hydraulic motor means is energized, the bale-discharge means is driven for discharging said parcel of bales to the ground.

21. An accumulator according to claim 20, further comprising a third hydraulic valve operatively coupled to the hydraulic motor means, and the fourth sensor means operated by the bale-transfer means so that hydraulic pressure fluid is directed to the hydraulic motor means when the bale-transfer means is in its home position and the hydraulic pressure fluid flow to the hydraulic motor means is interrupted when the bale-transfer means is moved away from its home position.

22. An accumulator according to claim 21 further comprising fifth sensor means operatively associated with the bale-discharge means for, upon the bale-discharge means completing a bale-discharge cycle, disengaging the bale-discharge means.

23. An accumulator according to claim 22, wherein the full load sensor means also is operatively associated with the second over-center device for, upon the detection of the accumulation of a parcel of bales on the load bed, tripping said second over-center device thus interrupting the bale-transfer cycle before the bale-transfer means reaches its fully extended position and returning the bale-transfer means to its home position.

24. An accumulator according to claim 23, wherein:

upon the detection of a parcel of bales on the load bed, the full load sensor means causes the bale-transfer means to return to its home position whereby the hydraulic motor means is energized; and after the discharge of the parcel of bales to the ground, the bale-discharge means is disengaged by the fifth sensor means while the hydraulic motor means is still energized.

25. An accumulator according to claim 24, wherein the main sensor means comprises a sensor member and a sensor linkage operatively coupling the sensor member to the first over-center device and the second over-center device; said sensor member being connectable to the sensor linkage at a plurality of locations along the length of the load bed.

* * * * *